US008929939B2

(12) United States Patent  (10) Patent No.: US 8,929,939 B2
Lindner  (45) Date of Patent: *Jan. 6, 2015

(54) SESSION-TRIGGERED PUSHING OF GROUP COMMUNICATION DATA

(71) Applicant: QUALCOMM Incorporated, San Diego, CA (US)

(72) Inventor: Mark Aaron Lindner, Verona, WI (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/667,763

(22) Filed: Nov. 2, 2012

(65) Prior Publication Data

US 2013/0059623 A1 Mar. 7, 2013

Related U.S. Application Data

(63) Continuation of application No. 12/689,690, filed on Jan. 19, 2010, now Pat. No. 8,335,532.

(51) Int. Cl.
*H04B 7/00* (2006.01)
*H04W 76/00* (2009.01)
*H04W 4/10* (2009.01)

(52) U.S. Cl.
CPC .............. *H04W 4/10* (2013.01); *H04W 76/005* (2013.01)
USPC .......................................... 455/518; 455/519

(58) Field of Classification Search
CPC ............................... H04W 76/005; H04W 4/10
USPC ............. 455/518, 519, 517, 39; 370/260, 390
See application file for complete search history.

(56) References Cited

U.S. PATENT DOCUMENTS

| | | | |
|---|---|---|---|
| 6,477,150 B1 * | 11/2002 | Maggenti et al. | 370/312 |
| 6,904,288 B2 * | 6/2005 | Rosen et al. | 455/518 |
| 7,548,972 B2 | 6/2009 | Belair et al. | |
| 8,077,634 B2 | 12/2011 | Maggenti et al. | |
| 8,116,230 B2 | 2/2012 | Logalbo et al. | |
| 8,335,532 B2 | 12/2012 | Lindner | |
| 2007/0054686 A1 | 3/2007 | Allen et al. | |
| 2007/0195735 A1 | 8/2007 | Rosen et al. | |
| 2008/0318610 A1 | 12/2008 | Bhaskaran et al. | |
| 2010/0011122 A1 | 1/2010 | Rosen et al. | |

FOREIGN PATENT DOCUMENTS

CN 101268705 A 9/2008
WO 2007101043 9/2007

OTHER PUBLICATIONS

International Search Report and Written Opinion—PCT/US2011/021648, ISA/EPO—May 24, 2011.
European Search Report—EP13185815—Search Authority—The Hague—Oct. 18, 2013.

* cited by examiner

*Primary Examiner* — Sonny Trinh
(74) *Attorney, Agent, or Firm* — Raphael Friewirth

(57) ABSTRACT

Exemplary techniques for sending data packages, such as media objects, during group communication sessions between wireless telecommunication devices, such as push-to-talk communication sessions, are disclosed. In one embodiment, the data packages, such as discrete data packages, are queued at the transmitting wireless communication device and then sent to other group members upon establishment of channels for group communications to the group members. The data packages can also be queued at the group communication server prior to being sent to a target device.

50 Claims, 20 Drawing Sheets

US 8,929,939 B2

SESSION-TRIGGERED PUSHING OF GROUP COMMUNICATION DATA

RELATED APPLICATIONS

This application is a continuation of and claims priority to U.S. patent application Ser. No. 12/689,690 entitled "Session-Triggered Pushing of Group Communication Data" filed on Jan. 19, 2010, which is assigned to the assignee hereof and hereby incorporated by reference in its entirety.

BACKGROUND

The present invention generally relates to wireless telecommunication systems. More particularly, the present invention relates to techniques for sharing various forms of media during group communication sessions between wireless telecommunication devices.

In wireless telecommunication devices, such as cellular phones, PDAs, mini-laptops, and advanced pagers, the devices typically communicate over long distances by bridging telephone calls through existing cellular telephone networks and passing data packets across the network. These wireless communication devices often have data processing and computing capabilities, and can accordingly send and receive software programs, in addition to voice, across the telephone network.

There exists a wireless telecommunication service that provides a quick one-to-one or one-to-many communication that is generically referred to as "Push-To-Talk" (PTT) capability. The specific PTT group of recipient devices for the communicating wireless communication device is commonly set up by the carrier. A PTT communication connection is typically initiated by a single button-push on the wireless communication device that activates a half-duplex link between the speaker and each member device of the group and once the button is released, the device can receive incoming PTT transmissions. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" where no other group member can speak while the speaker is speaking. Once the speaker releases the PTT button, any other individual member of the group can engage his or her PTT button and he or she will have the floor. Generally speaking, the PTT system uses standard voice-over internet protocol (VoIP) technologies. Voice information is sent in digital form over IP-based data networks. In PTT scenarios, instead of using the standard cellular infrastructure a call is formed by combining separate point-to-point connections between each IP endpoint in the network. Initiating the PTT system generates a call to the target device. The call originator's voice can be sent through the carrier's network to the target handset.

In existing PTT systems, member devices will only communicate voice data between the devices during a communication session. It is difficult to include other data in the group communication because of the size of the data and the device resources necessary to handle non-voice data. The existing wireless communication devices therefore send non-voice data, such as data packages, through specific data channels established between the device and a wireless communication network.

Accordingly, it would be advantageous to provide a system and method for a wireless communication device to economically send data packages and other data packages to others during a PTT or other group communication session.

SUMMARY

The present system and method provide for the queuing and forwarding of data packages intended to be sent in a group communication session between wireless communication devices. An exemplary embodiment describes a method that includes, but is not limited to, receiving, at a wireless communication device, a request to send a data package to a target over a group communication channel; determining whether the group communication channel is open at the wireless communication device; and in response to determining that the group communication channel is not open at the wireless communication device performing: selectively storing the data package in a queue configured to store a plurality of data packages; determining whether a memory size of the plurality of data packages stored in the queue is greater than a predetermined memory size threshold; in response to determining that the memory size of the plurality of data packages stored in the queue is not greater than the predetermined memory size threshold, determining whether an indication that the group communication channel has been opened is received at the wireless communication device; and in response to receiving an indication that the group communication channel has been opened, sending, from the wireless communication device, all data packages stored in the queue intended for the target. The queued data packages do not necessarily all have to be intended for the same target member wireless communication device of the communication group.

An exemplary embodiment includes a method that includes, but is not limited to, receiving, at a server, a data package from an originating wireless communication device over a group communication channel, wherein the data package is intended to be sent to one or more of target group members of a communication group; determining whether the group communication channel is open from the server to all of the target group members; selectively storing the data package in a queue in response to determining that the group communication channel is not open from the server to all of the target group members, wherein the queue is configured to store a plurality of data packages; determining whether a memory size of the plurality of data packages stored in the queue is greater than a predetermined memory size threshold; in response to determining that the memory size of the plurality of data packages stored in the queue is not greater than the predetermined memory size threshold, determining whether the group communication channel with all of the target group members has been opened; and sending all data packages stored in the queue intended for the target group members in response to determining that the group communication channel with all of the target group members has been opened.

An exemplary embodiment includes a a method that includes, but is not limited to, receiving, at a wireless communication device, a request to send a data package to a target over a group communication channel; determining whether the group communication channel is open at the wireless communication device; selectively storing the data package in a queue configured to store a plurality of data packages in response to determining that the group communication channel is not open at the wireless communication device; identifying all data packages stored in the queue that are intended for the target; determining whether a memory size of all data packages stored in the queue that are intended for the target is greater than a predetermined memory size threshold; establishing the group communication channel in response to determining that the memory size of all data packages stored in the queue intended for the target is greater than the predetermined memory size threshold; and sending to the target, from the wireless communication device, all data packages stored in the queue intended for the target over the established group communication channel.

An exemplary embodiment includes a method, which includes but is not limited to, receiving, at a server, a data package from an originating wireless communication device over a group communication channel, wherein the data package is intended to be sent to one or more of target group members of a communication group; determining whether the group communication channel is open from the server to all of the target group members; selectively storing the data package in a queue configured to store a plurality of data packages in response to determining that the group communication channel is not open from the server to all of the target group members; identifying all data packages stored in the queue intended for the target group members; determining whether a memory size of all data packages stored in the queue intended for the target group members is greater than a predetermined memory size threshold; establishing the group communication channel from the server to the target group members in response to determining that the memory size of all data packages stored in the queue intended for the target group members is greater than the predetermined memory size threshold; and sending all data packages stored in the queue intended for the target group members over the established group communication channel.

In addition to the foregoing, other aspects are described in the claims, drawings, and text forming a part of the present disclosure.

The present system and method are therefore advantageous in that they allow a wireless communication device to economically send data packages and other data packages to others during a PTT communication session. Furthermore, the method of queuing and forwarding bundles of data packages can also be performed at the group communication server if the system is so embodied. The system and method thus have industrial applicability as they can be implemented on a group communication system and prevent the uneconomical opening of group communication channels unless they can be optimally utilized for data package transmission. The foregoing is a summary and thus contains, by necessity, simplifications, generalizations and omissions of detail. Those skilled in the art will appreciate that the summary is illustrative only and is not intended to be in any way limiting.

DETAILED DESCRIPTION

In this disclosure, the terms 'communication device,' 'wireless telephone,' 'wireless communications device,' 'PTT communication device,' 'handheld device,' 'wireless communication device,' and 'handset' are used interchangeably. The terms 'call' and 'communication' are also used interchangeably. The term 'group communication' is intended to encompass a half duplex, or virtual half-duplex communication channel used for one-to-many communications, such as push-to-talk half duplex communications, but can also embrace one-to-one communication where there are two only two group members present and communicating. The term 'exemplary' means that the disclosed element or embodiment is only an example, and does not indicate any preference of use. Further, like numerals refer to like elements throughout the several drawings, and the articles "a" and "the" include plural references, unless otherwise specified in the description. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

Figure 1:
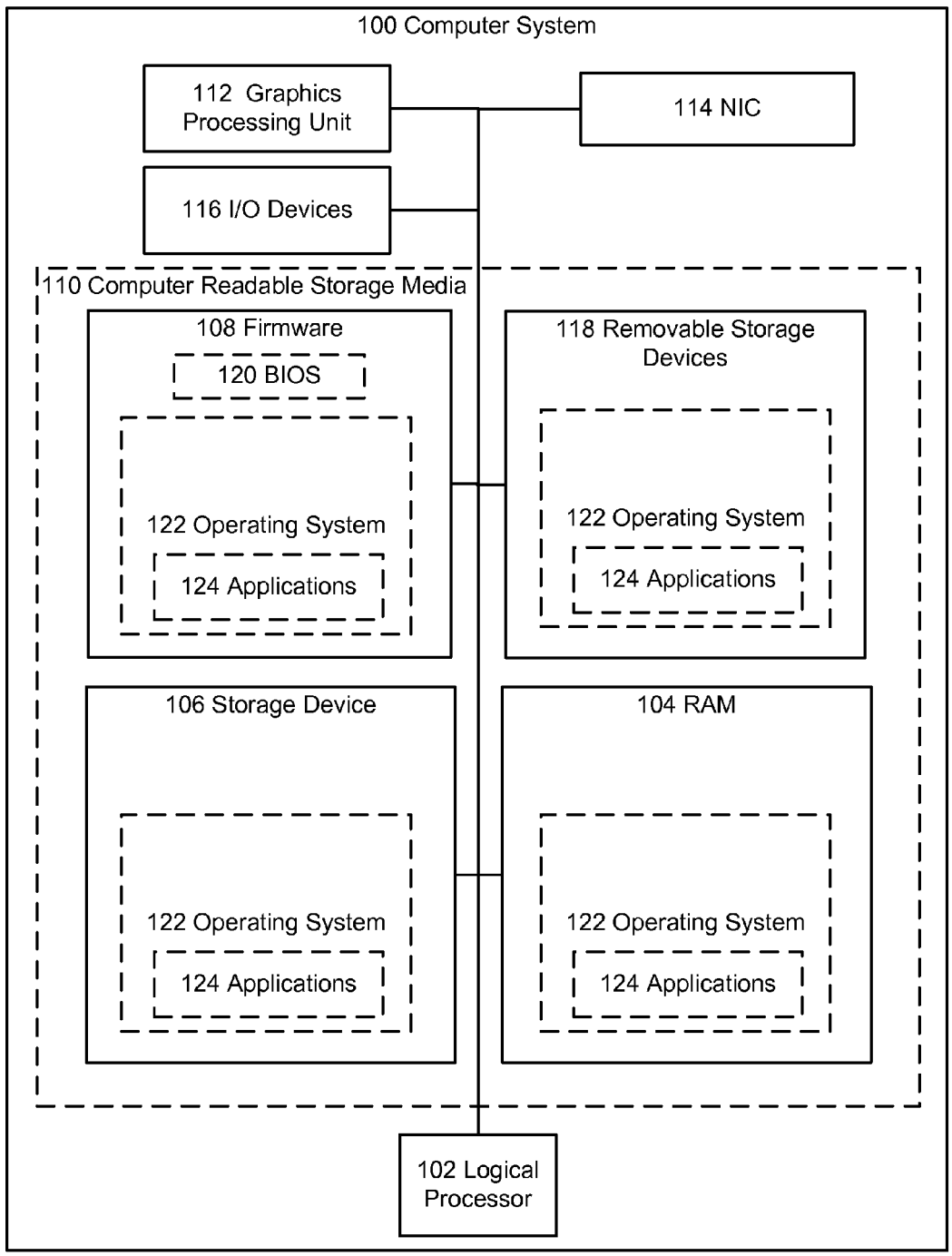
FIG. 1 describes an example environment for practicing aspects of the present disclosure.

Embodiments may execute on one or more computers. FIG. 1 and the following discussion are intended to provide a brief general description of a suitable computing environment in which the disclosure may be implemented. One skilled in the art can appreciate that computer systems disclosed herein can have some or all of the components described with respect to computer 100 of FIG. 1.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by a system bus which couples various system components to the logical processor 102. The system bus may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used to store data, such as magnetic cassettes, flash memory cards, digital video disks, Bernoulli cartridges, etc.

The computer readable storage media provide storage of computer readable instructions, data structures, program modules and other data for the computer 100. A basic input/output system (BIOS) 120, containing the basic routines that help to transfer information between elements within the computer system 100, such as during start up, can be stored in firmware 108. A number of applications 124 and an operating system 122 may be stored on firmware 108, storage device 106, RAM 104, and/or removable storage devices 118, and executed by logical processor 102.

Commands and information may be received by computer 100 through input devices 116 which can include, but are not limited to, keyboards and pointing devices. Other input devices may include microphones, joysticks, game pads, scanners or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114 (NIC). The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
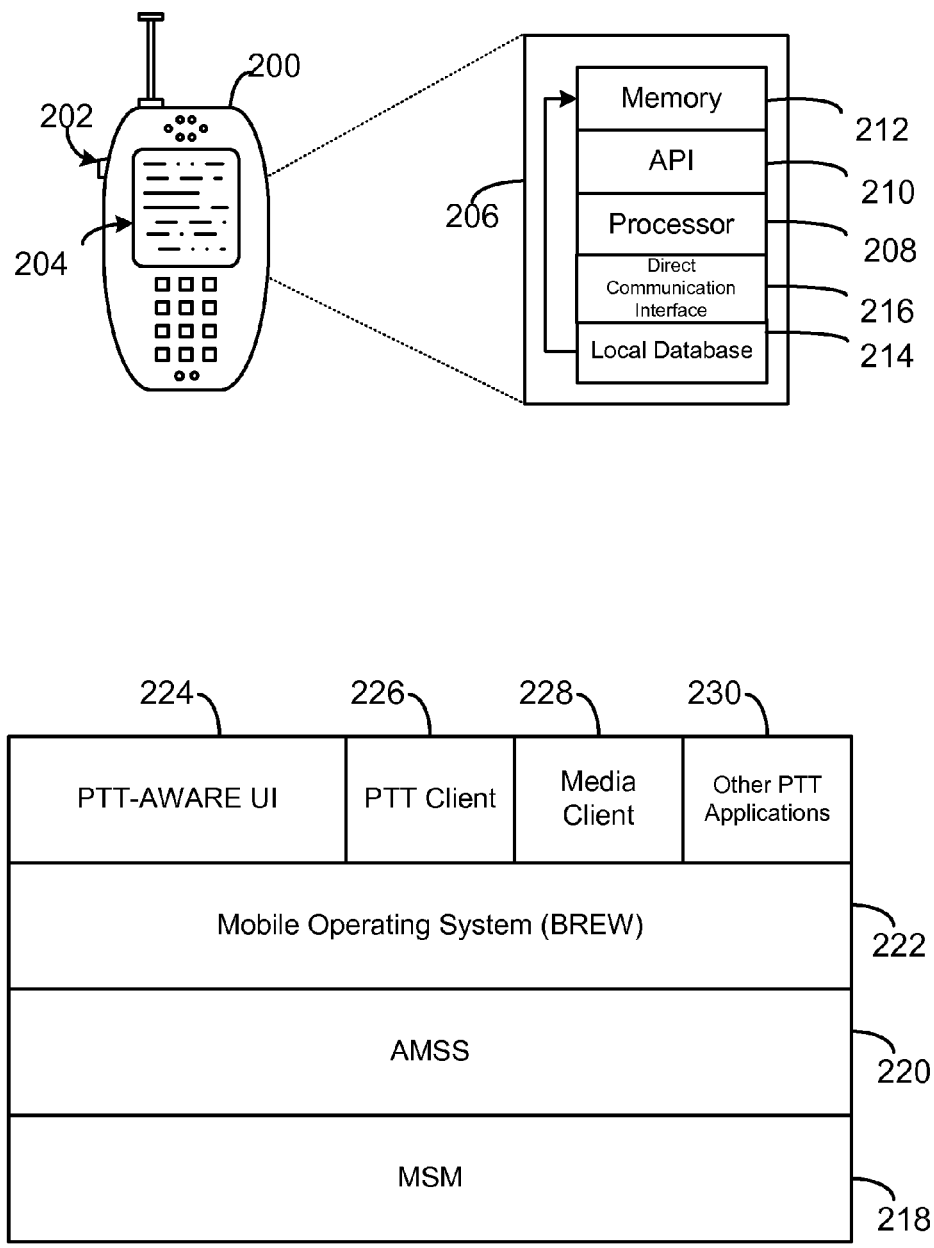
FIG. 2 depicts an example wireless communication device.

Referring now to FIG. 2, it illustrates an example wireless telecommunication device that can be a wireless communication device 200 with a PTT button 202 that opens the direct communication to a target device, e.g., an endpoint associated with an IP address. The wireless communication device 200 is also shown as having a graphics display 204. The wireless communication device 200 can include a computer platform 206 that can handle voice and data packets, execute software applications, and transmit information across a wireless network. The computer platform 206 includes, among other components, a processor 208 such as an application-specific integrated circuit ("ASIC") or a RISC processor such as those that implement the ARM architecture. The processor 208 is installed at the time of manufacture of the wireless communication device 200 and is not normally upgradeable. The processor 208 or other processor executes an application programming interface ("API") layer 210, which includes the resident application environment, and can include the operating system loaded on the processor 208. The resident application environment interfaces with any resident programs in the memory 212, e.g., a computer readable storage medium of the wireless communication device 200. An example of a resident application environment is the "binary runtime environment for wireless" (BREW) software developed by QUALCOMM® for wireless communication device platforms.

As shown here, the wireless communication device 200 can be a wireless communication telephone, with a graphics display 204, but can also be any wireless device with a computer platform 206 as known in the art, such as a personal digital assistant (PDA), a pager with a graphics display 204, or even a separate computer platform 206 that has a wireless communication portal, and may otherwise have a wired connection to a network or the Internet. Further, the memory 212 can be comprised of read-only or random-access memory (RAM and ROM), EPROM, EEPROM, flash cards, or any memory common to computer platforms. The computer platform 206 can also include a local database 214 for storage of software applications not actively used in memory 212. The local database 214 is typically comprised of one or more flash memory cells, but can be any secondary or tertiary storage device as known in the art, such as magnetic media, EPROM, EEPROM, optical media, tape, or soft or hard disk. The graphics display 204 can present not only information about the ongoing group call, but also the information about the data package in order to generate a preview as is more fully described herein.

The computer platform 206 can also include a direct communication interface 216 that can open a direct communication channel. The direct communication interface 216 can also be part of the standard communication interface for the wireless communication device 200 which ordinarily carries the voice and data transmitted to and from the wireless communication device 200. The direct communication interface 216 typically is comprised of hardware as is known in the art.

Continuing with the description of FIG. 2, additionally depicted is a diagram of one embodiment of the software layers of the group application client that can include, but is not limited to, PTT functionality and data package functionality. While the embodiment shown herein is implemented in a PTT session, the present system can be utilized in any group communication session setup for transmission of voice and/or data substantially simultaneously among group members. In an embodiment, the computer platform 206 in the wireless communication device environment can include a series of software "layers" developed on top of the Wireless communication Station Modem (MSM) 218 and the Advanced Wireless communication Subscriber Software (AMSS) 220, developed by QUALCOMM®. In this example the underlying MSM chipset can implement the software protocol stack for the entire suite of CDMA communication technologies that include CDMA2000 1X and CDMA2000 1xEV-DO. In this example the AMSS 220 can be configured to support a wireless communication operating system layer 222, which in an embodiment is BREW®, also developed by QUALCOMM®. The wireless communication operating system layer 222 can provide an application programming interface for chip or device-specific operations, while providing an isolation layer that eliminates direct contact to the AMSS 220 and any OEM software on the computer platform. The wireless communication operating system layer 222 can enable application development that uses wireless communication device features without having to rewrite the application each time a new release of the device-specific software is released.

In this example the wireless communication operating system 222 can include a PTT client 226 that is configured to offer access to PTT services through an external interface, here shown at a PTT-aware UI 224. The PTT client 226 can include all the functions required to enable wireless communication operating system 222 applications, such as the media client 228. In an embodiment, the PTT client 226 can maintain access to PTT services, respond to communication requests, process all PTT-aware wireless communication operating system applications requests for PTT services, process all outgoing PTT requests, collect and package vocoder packets for originating PTT talk spurts, and parses packets of vocoder data for terminated PTT talk spurts.

The media client 228 can be a wireless communication operating system-based application that extends PTT services for access to media types other than the traditional half duplex voice communications (VoIP-PTT media). The media client 228 can provide access to media services through an external interface such as a media aware API that is an application that may be developed entirely as a wireless communication operating system-based application or used in combination with an AMSS 220 interface. The media client 228 can service requests from the user and inform the user of the result of any group-directed media request. The media client 228 can additionally be configured to handle incoming notifications that indicate there is data package to download from a media server 316 of FIG. 3 and described in more detail below. For example, the media client 228 can be configured in one embodiment to download data packages immediately or in other embodiments the media client 228 can be configured to download the data package at a predetermined time period, e.g., at 10:00 pm daily, or it can be configured to prompt the user via the PTT UI 224 to determine whether and/or when to download the file. Other push-to-talk applications 230 or applications that can receive and transmit data across the group communication channel can also be resident on the platform.

Figure 3:
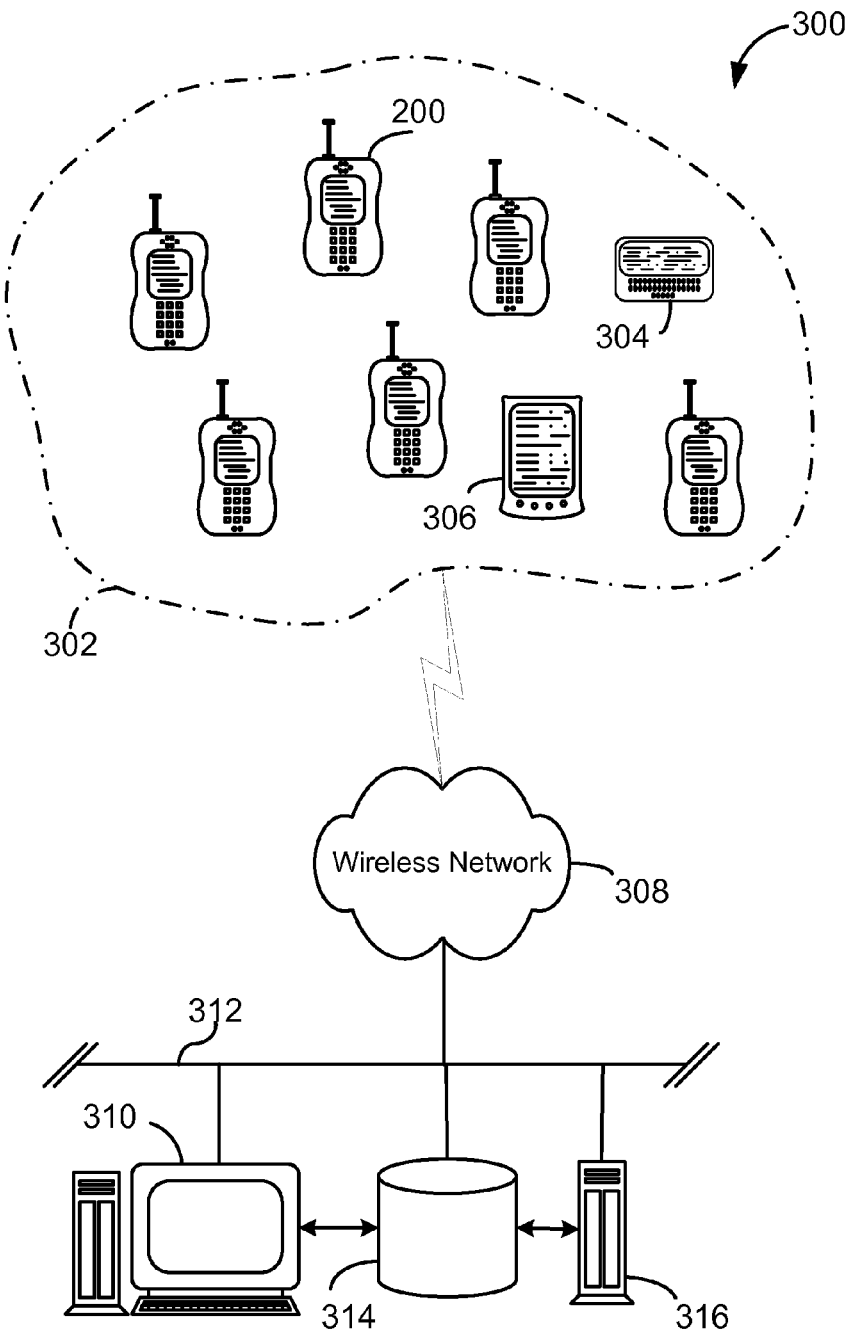
FIG. 3 depicts an example system for sharing data packages.

FIG. 3 illustrates an example embodiment of a system 300 for sharing data packages among one or more wireless telecommunication devices in a PTT group 302, such as the wireless communication device 200, smart pager 304 and personal digital assistant (PDA) 306, with other wireless communication devices. In the system 300, each wireless telecommunication device 200, 302, and 306 can be capable of selectively directly communicating across the wireless communication network 308 with a target set of one or more other wireless telecommunication devices. For example, the target set for wireless communication telephone 200 can be all devices in the communication group 302 or a subset thereof, such as pager 304 and PDA 306.

In an embodiment, the wireless telecommunication device (such as wireless communication telephone 200) can send a flag to at least the communications server 310 that can have components similar to computer 100 of FIG. 1, which is present on a server-side LAN 312 across the wireless network 308. The flag in this example can be used by the server to determine that the wireless device is present, i.e. accessible, on the wireless network 308. The communication server 310 can share this information with a set of target wireless telecommunication devices designated by the first wireless telecommunication device or it can also share this with other computer devices resident on the server-side LAN 312 or accessible across the wireless network 308. The group communication computer 310 can have an attached or accessible database 314 to store the group identification data for the wireless devices. A media server 316 (that can include components similar to computer 100 of FIG. 1) can additionally include circuitry for a file management server that can be present on the server-side LAN 312. It should be appreciated that the number of computer components resident on server-side LAN 312, or across the wireless network 308, or Internet generally, are not limited.

The communications server 310 can establish point to point IP PTT channels between devices in the group 302. A PTT channel can be established through a half-duplex channel (true or virtual) between the communicating wireless telecommunication device 200, 304, and/or 306 and the one or more other wireless telecommunication devices of the target set. Also, the group communication server 310 can attempt to bridge the requested direct communication with the target set if at least one of the wireless telecommunication devices of the target set have informed the group communication server 310 of their presence on the wireless network 308.

The communications server 310 can also inform the wireless telecommunication device 200, 304, and 306 of the inability to bridge a direct communication to the target set 302 upon none of the wireless telecommunication devices (or at least one) of the target set not having informed the group communication server 310 of their presence on the wireless network 308. Further, while the communications server 310 is shown here as having the attached media server 316 of group identification data, the group communication computer device 310 can have group identity data resident thereupon, and perform all storage functions described herein.

In overview, the system 300 can include at least one wireless communication device, such as wireless communication telephone 200, that can be a member of a communication group 302 of wireless communication devices. The wireless communication devices in this example can be configured to communicate with each other or communicate as a group across a wireless communication network 308. In addition, at least one of the wireless communication devices can be configured to selectively send data packages to other members of the communication group 302. At least one communications server 310 is configured to store information on communication groups 302 on the wireless communication network 308, the information including the identity of the specific member wireless communication devices of one or more communication groups. The communications server 310 is further configured to selectively receive data packages from a sending wireless communication device, such as wireless communication telephone 200, of a communication group 302.

The media server 316 can be configured to receive the data packages from the wireless communication device (such as wireless communication phone 200) and selectively permit members of the communication group 302 to access the stored data packages across the wireless communication network 308. In an embodiment data packages can include, but is not limited to, pictures in JPEG, TIF, and the like, audio files such as MP3, MP4, WAV, and the like, documents, and/or presentations. The data packages can additionally include streaming media, such as a multimedia application (Powerpoint, MOV file, and the like). Also, the data packages could be half-duplex video conferencing among members of the communication group wherein the picture of the speaker is broadcast to the other group members in substantial real-time, or in delay.

The size of the data package files can be very large and because of the potential delay of sending the media, or inability of the receiving wireless communication device to handle the sent media, the system 300 can use a media server 316 to store the data packages such that target members of the communication group 302 can selectively access the stored media without interrupting other PTT communications. Alternatively, in one embodiment, if the data packages are stored at the media server 316, the media server 316 can be configured to send a hypertext link to the originating device or the target wireless communication devices of the communication group 302. The hypertext link in this example can provide a link to the stored group-directed media at the media server 316. Upon receipt of data packages by at least one of the member wireless devices of the communication group 302, the communications server 310 can send an acknowledgement indicating to the wireless communication device 200, 304, and 306 that at least one member wireless communication device of the communication group 302 received the data package.

The wireless communication device 200, 304, 306 can send communication group identification data to the communications server 310 at the time of sending a data package, e.g. a target list, and thus, the media server 316 can be configured to send or store the data package to or for the member wireless communication devices identified in the communication group identification data based upon a variety of criteria as is further discussed herein. Alternately, prior to the wireless communication device sending data packages, the wireless communication device 200, 304, and 306 can request member data for a communication group 302 from the communications server 310, and the server 310 can send one or more addresses or communication group addresses to the wireless communication device 200, 304, and 306. In one embodiment, the communications server 310 can filter the potential communication groups available based upon their member devices' capability to received data packages.

As is further described herein, the wireless communication device 200, 304, and 306 can be engaged in a group communication with the member wireless communication devices of the communication group 302, and send data packages during the group communication in the same communication session, either to all members or a subset thereof. Alternately, the data packages can be sent independently of the group-communication session.

Figure 4:
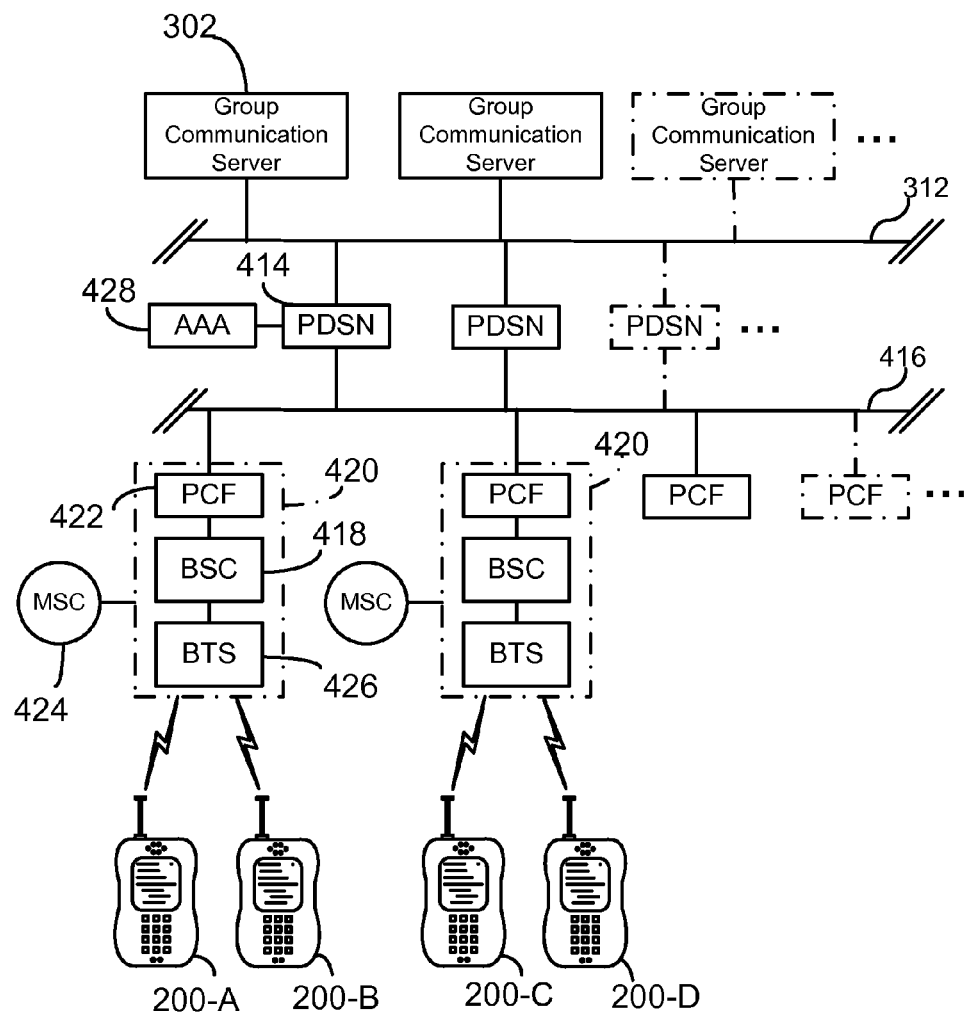
FIG. 4 shows an example wireless network.

FIG. 4 shows an exemplary wireless network in a common cellular telecommunication configuration. The wireless network in this example can include a series of communications servers 310 that control communications between the wireless communication devices of set group members (devices 200-A through D) in a PTT system. The wireless network is merely exemplary and can include any system whereby remote modules communicate over-the-air between and among each other and/or between and among components of a wireless network, including, without limitation, wireless network carriers and/or servers. A series of communications servers 310 are connected to a group communication server LAN 312. Wireless telephones can request packet data sessions from the group communications server(s) 310 using a data service option.

Continuing with the description of FIG. 4, the communications server(s) 310 in this example can be connected to a wireless service provider's packet data service node (PDSN) such as PDSN 414, shown here resident on a carrier network 416. When a wireless communication device access the wireless data network to obtain services, the PDSN 414 can interface with an authentication, authorization, and accounting server "AAA" 428 to authenticate the wireless communication devices 200, 304, and/or 306. The AAA 428 can be coupled to a database operable to store information such as user accounts and privileges. Each PDSN 414 can interface with a base station controller 418 of a base station 420 through a packet control function (PCF) 422. The PCF 422 can be located in the base station 420. The wireless network 308 can control messages (generally in the form of data packets) sent to a messaging service controller ("MSC") 424. The carrier network 308 in this example can communicate with the MSC 424 by a network, the Internet and/or POTS ("plain ordinary telephone system"). Typically, the network or Internet connection between the wireless network 308 and the MSC 424 transfers data, and the POTS transfers voice information. The MSC 424 can be connected to one or more base stations 420. In a similar manner to the carrier network, the MSC 424 is typically connected to the branch-to-source (BTS) 426 by both the network and/or Internet for data transfer and POTS for voice information. The BTS 426 ultimately broadcasts and receives messages wirelessly to and from the wireless devices, such as cellular telephones 200-A through D, by short messaging service ("SMS"), or other over-the-air methods known in the art. It should also be noted that carrier boundaries and/or PTT operator network boundaries do not inhibit or prohibit the sharing of data as described herein.

Cellular telephones and wireless communication telecommunication devices, such as wireless telephone 200, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 200, can download many types of "data packages," which are discrete segments of computer code, such as applications, web pages, applets, MIDlets, multi-media, picture, games and simple data. In wireless devices that have designated a communication group 302 (such as depicted by FIG. 3), the wireless communication device can directly connect with the other member of the set and engage in voice and data communication. However, such direct group communications will occur through, or at the control of, the group communication computer device 310. All data packets of the devices do not necessarily have to travel through the communication server 310 itself, but the communication server 310 must be able to ultimately control the communication because it will typically be the only server-side component that is aware of and/or can retrieve the identity of the members of the communication group, or direct the identity of the members of the communication group 302 to another computer device.

The following are a series of flowcharts depicting operational procedures. The flowcharts are organized such that the initial flowcharts present implementations via an overall viewpoint. Those having skill in the art can appreciate that the style of presentation utilized herein, e.g., beginning with a presentation of a flowchart(s) presenting an overall view and thereafter providing additions to and/or further details in subsequent flowcharts, generally allows for a rapid and easy understanding of the various operational procedures.

Figure 5:
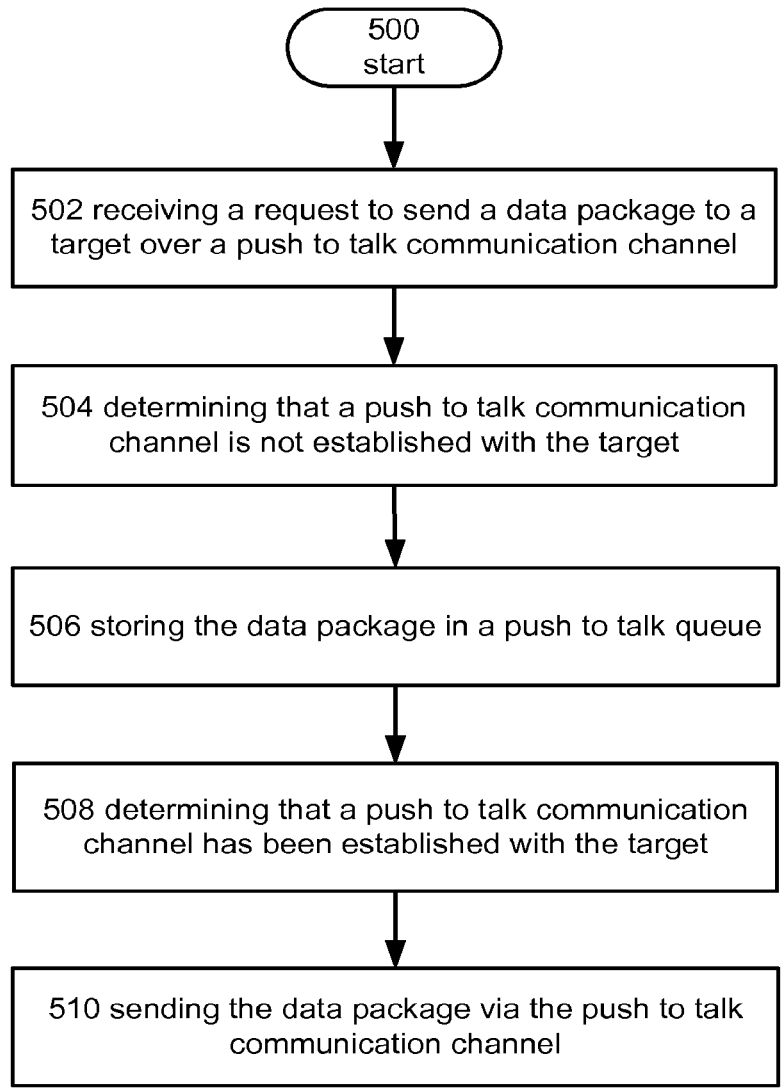
FIG. 5 illustrates an example operational procedure 500.

FIG. 5 depicts an operational procedure for practicing aspects of the present disclosure, as shown by the Figure, the operational procedure includes operations 500-510. As shown by the figure, operation 500 begins the procedure and operation 502 depicts receiving a request to send a data package to a target over a group communication channel. For example, and referring to FIG. 2, the processor 208 can execute instructions indicative of the PTT-aware UI 224 and a user interface can be displayed by display 204. The user input interface of wireless communication device 200, e.g., a keyboard, touchpad, mouse, trackball, etc., can receive a request to send a data package, e.g., a picture, over a push to talk communication channel. In a specific example, a user may wish to quickly send a picture of something to a member of his or her group 302 and thus, decide to send the picture via push to talk instead of by email.

Continuing with the description of the operational procedure, operation 504 shows determining that at least one group communication channel is not established with the target wireless communication device. For example, the processor 208 can determine that a push to talk communication channel does not exist between the originator, e.g., device 200, and a target, e.g., device 304 or communications server 310 of FIG. 3, from, for example, information obtained from the PTT client 226. In a specific example media client 228 can be executed and the PTT client 226 can receive a request for information that identifies whether a PTT channel is opened with the target. The PTT client 226 can be run and a signal indicative of the fact that such a channel is not established can be returned to the media client 228.

Turning to operation 506, it shows selectively storing the data package in a queue. In an embodiment, processor 208 can execute instructions and store the data package can be stored in a queue, e.g. memory 212. For example, storing the data package in the queue can include storing a pointer to the data package in an area of memory identified as the queue or it can include physically storing a copy of the data package in an area identified as the queue. In this example, instead of establishing a PTT channel, the data package can be stored and sent at a later point when a communication is established to one or more or the targets.

Operation 508 shows determining that a group communication channel has been established with the target wireless communication device. For example, sometime after the data package has been stored in the queue, a PTT channel may be established between the originator, e.g., device 200, and some other PTT enabled target such as the communications server 310 or another device, e.g., device 304. In a specific example, the media client 228 could have configured the processor 208 to listen for connections made between the originator and the target. In this example when a channel is opened with the target the media client 228 can receive information indicating that a channel has been opened.

In a specific example a signal indicating that the device 200 has the floor can be used to notify the media client 228 that a PTT session has been established with the target. When a PTT channel is requested the communications server 310 can receive a call setup request message indicating that a user of device 200, 304, or 306 wants to establish a push to talk session. The call setup request can contain, for instance, the target device's address, and an indication that data packages are to be shared, and information that identifies the media server 316 that stores media for the wireless communication device 200. The call setup request may also be sent with a DataOverSignaling Access channel message. In this example the communications server 310 can be configured to perform PTT call setup functions, including locating the target, opening up IP channels between various IP endpoints in the network 308, applying call restrictions, selecting a vocoder and location and/or assign a media server 316 to handle storing any data packages uploaded during the PTT session. The media server 316 can then be notified that a media PTT session is being created and the identities of both the originator device and the target device. In this example the communications server 310 can include circuitry operable to determine whether wireless communication device 200 is allowed to send/receive data packages and/or whether the target is authorized to send/receive data packages. If for example, both devices are allowed to send/receive data packages and the target is available for a PTT session the communications server 310 can send the acknowledgment message to the originating wireless communication device 200 and the originating wireless communication device can obtain the floor.

Operation 510 shows sending all queued data packages to at least the group communication server via the established group communication channel. For example, the originating device can send the data package to the target via the established PTT channel. In a specific example, the media client 228 can be executed by the processor 208 and the processor 208 can send the data package to the target via a transceiver of the device 200. Since the data package is sent during a PTT channel that is already established, the cost of setting up sessions on the network is reduced.

In a specific example, the data package can be sent in conjunction with voice during a PTT talk spurt. In response to receiving the floor grant message, the media client 228 can request permission send data that includes voice and the data package. That is, in this example there is only a single floor control mechanism that is used for both the PTT call and sharing media and when the channel is opened the media client 228 can send media during a talk spurt. The media client 228 can request that the PTT client 226 add a data package to the existing PTT call. The add-media request can contain an indication that the media is to be shared using the same floor control mechanism as the PTT Client 226. The PTT Client 226 can request that the communications server 310 add a new media type to the existing call. The communications server 310 can verify that the target can support the new media type. After the new media type has been successfully added to the PTT call, the data package can be sent.

In another specific example the media client 228 can be configured to send a data package to the target using a different floor control mechanism than the PTT call. That is, the data package can be sent independently from voice data over a media PTT channel. In an embodiment when the media client 228 receives a signal indicating that a channel has been opened with the target, the media client 228 can send the data package. In this scenario, the user of wireless communication device 200 can participate in a PTT call and when the channel is opened the processor 208 can be interrupted and run media client 228 instructions that direct it to send the data package from the queue. The media client 228 can be configured to determine that the data package is intended to be shared using a separate floor control mechanism than the PTT call, i.e. independent of the floor control mechanism being used for the PTT call, and send a request to the PTT client 226 to add a new media type to the existing PTT call. The add media request can contain an indication that the data is to be shared using a different floor control mechanism than the PTT call. The PTT Client 226 can send a request to the communications server 310 to add a new media type to the existing call. The communications server 310 can be configured to verify that one or more of the call participants can support the new media type and then the communications server 310 can send a notification to the call participants indicating that a new media type is being added to the call. In an embodiment, the notification to the call participants can contain a floor identifier for a separate media floor, in addition to a new destination port number on the media server 316 for the distribution of the data package.

After the new media type is successfully added to the PTT call, the processor 208 can configure the media client 228 to request permission to send group directed media to the target. The PTT request from the PTT client 226 can contain the floor identifier assigned to the group-directed media floor. The communications server 310 can verify that the data floor is available prior to granting the floor request. The PTT client 226 can then notify the media client 228 that the floor request was granted and the data package can be sent to the target.

Figure 6:
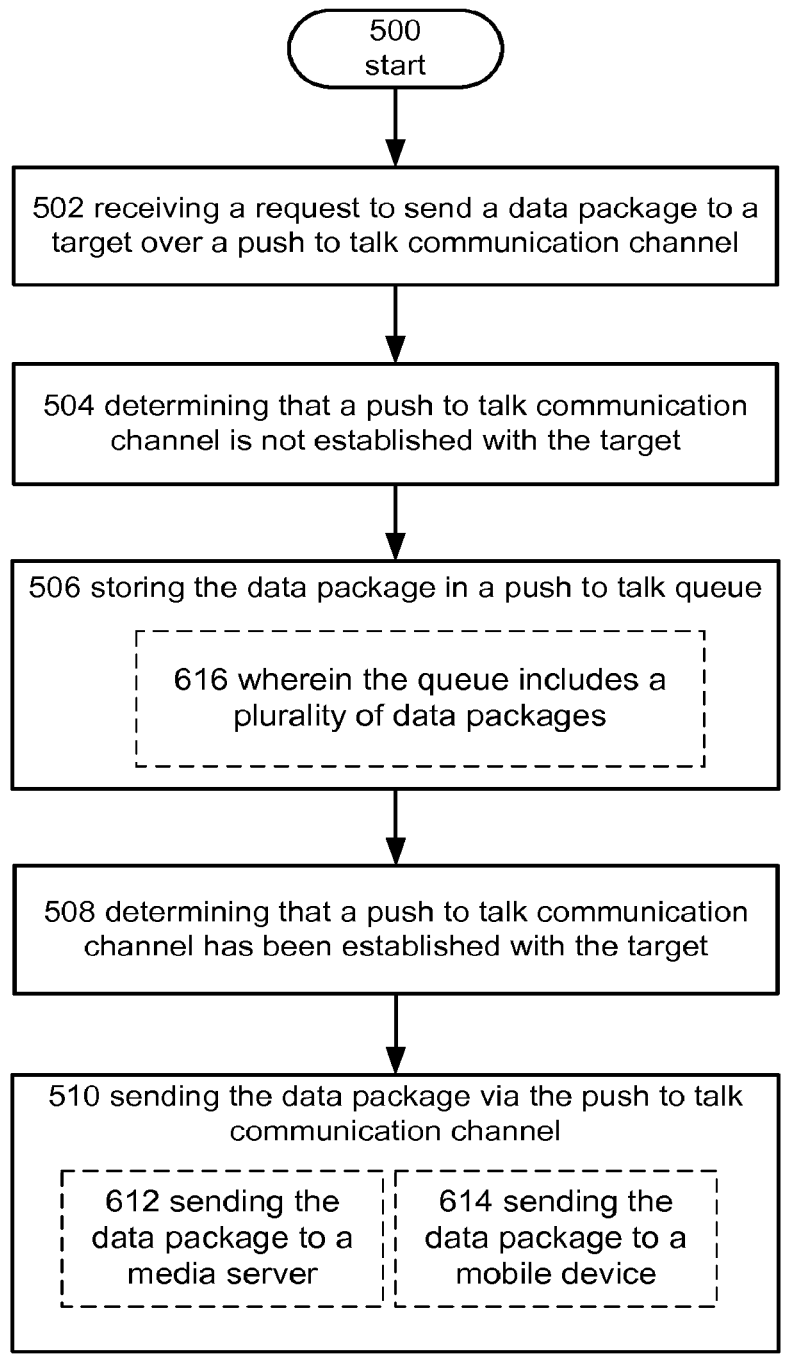
FIG. 6 illustrates an alternative embodiment of the operational procedure of FIG. 5.

Turning now to FIG. 6, it shows an alternative embodiment of the operational procedure 500 of FIG. 5 including additional operations 612, 614, and 616. In an embodiment, sending the data package can include, but is not limited to, sending the media object to a media server. For example, in an embodiment the target can be the media server 316. In this example processor 208 can execute instructions indicative of the media client 228 and send one or more packets of information indicative of a data package to a media server 316. The media server 316 can then be configured to either send the data package to the target or store the data package.

Continuing with the description of FIG. 6, operation 614 illustrates sending all queued data packages to a target wireless communication device. For example, in an embodiment the target can be another wireless communication device e.g., device 304. The communications server 310 can establish a PTT channel between the originating device and the target device, e.g., device 304. In this example, when the PTT channel is established the media client 228 can be executed by the processor 208 and the processor 208 can obtain the data package from the queue and send it to the target via a transceiver of the device 200.

As shown by FIG. 6, operation 616 illustrates that in an embodiment the queue includes a plurality of data packages. For example, in an embodiment, the queue, e.g., an area of memory 212, can include multiple data packages that can be addressed to one target and/or multiple targets. In this example, when the PTT channel is established the media client 228 could receive information from the PTT client 226 indicating that a channel has been opened and the media client 226 can be executed by the processor 208 and the processor 208 can obtain the data packages from the queue.

In an example embodiment when a PTT channel is opened between the originating device and the media server 316, all the data packages addressed to different target devices, e.g., devices 304 and 306 can be uploaded to the media server 316. In this example, the media server 316 can sort the data packages by the target's addresses and store them in database 314 so that they can be sent at a later time. In another example, data packages addressed to a single target can be uploaded and stored in database 314 or data packages associated with a subset of targets can be uploaded.

In an example embodiment, when a PTT channel is opened between the originating device and remote wireless communication device, e.g., device 304, all the data packages addressed to the target can be sent via the PTT channel. In this example the communications server 310 can handle the call setup functions and a copy of the data package(s) can be stored by the media server 316.

Figure 7:
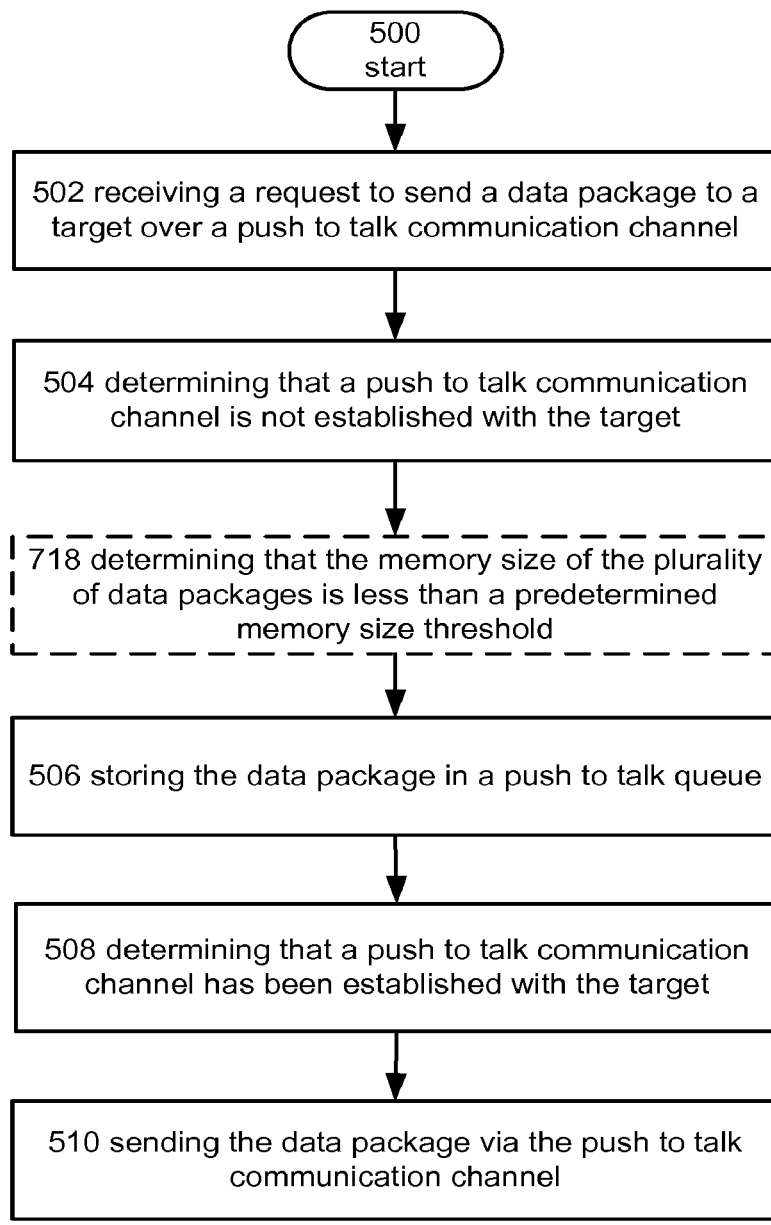
FIG. 7 illustrates an alternative embodiment of the operational procedure of FIG. 5.

Turning now to FIG. 7, it illustrates an alternative embodiment of the operational procedure of FIG. 6 including operation 718 which shows determining that the memory size of a plurality of queued data packages is less than a predetermined memory size threshold. In an embodiment, the processor 208 can execute instructions that configure it to determine how large the data packages in the queue are, e.g., by adding up the memory size of each data package, and compare this value to a predetermined amount. In an embodiment, if the total size of the memory objects is in the queue less than the predetermined value then the device can be configured to wait until a PTT channel is opened before the data packages are sent. For example the media client 228 could then configure the processor 208 to listen for when a PTT channel is established. In a specific example, the predetermined threshold could be set to 5 megabytes. In this case, if 3 data packages are added to the queue and each data package is 1 megabyte in size, then the total would be less than the predetermined threshold and a determination can be made to wait to send the data packages until a PTT channel is opened can be made.

Figure 8:
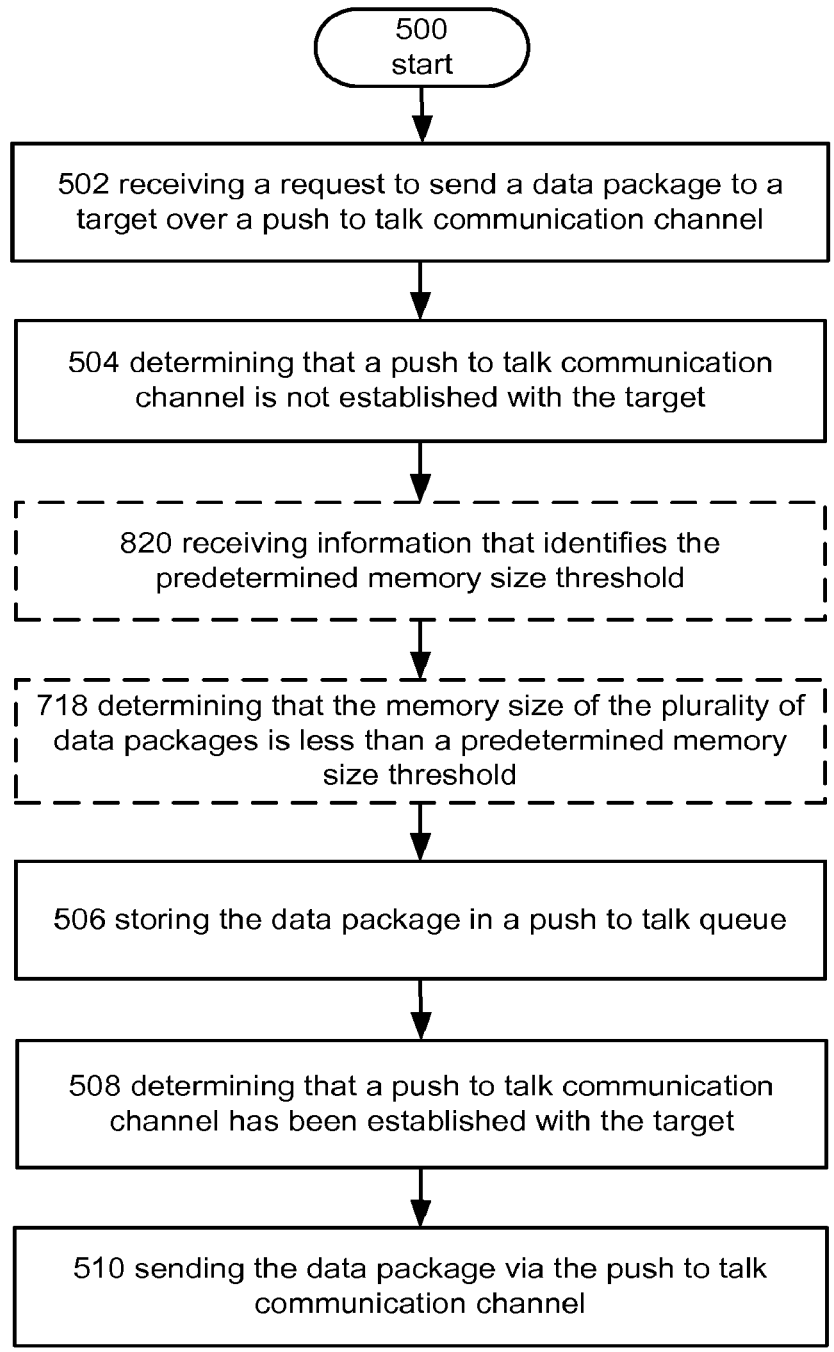
FIG. 8 illustrates an alternative embodiment of the operational procedure of FIG. 7.

Referring to FIG. 8, it depicts an alternative embodiment of the operational procedure of FIG. 7 including operation 820 which shows receiving information that identifies the predetermined memory size threshold. For example, in an embodiment the predetermined threshold can be based on information that is received from the network. Circuitry of the network can send a signal to wireless communication device 200 on a command channel which indicates the current network threshold value. The wireless communication device 200 can execute instructions to set a value in a data structure that can be used by the media client 228 to determine whether the threshold has been reached. In an embodiment the information can be set in accordance with information in a user profile of a user associated with the wireless communication device 200, a static value that assigned based on the location of the base station controller, a static value that set by a network administrator or it can be a function of some other variable such as, for example, the time of day, day of the week, etc.

Figure 9:
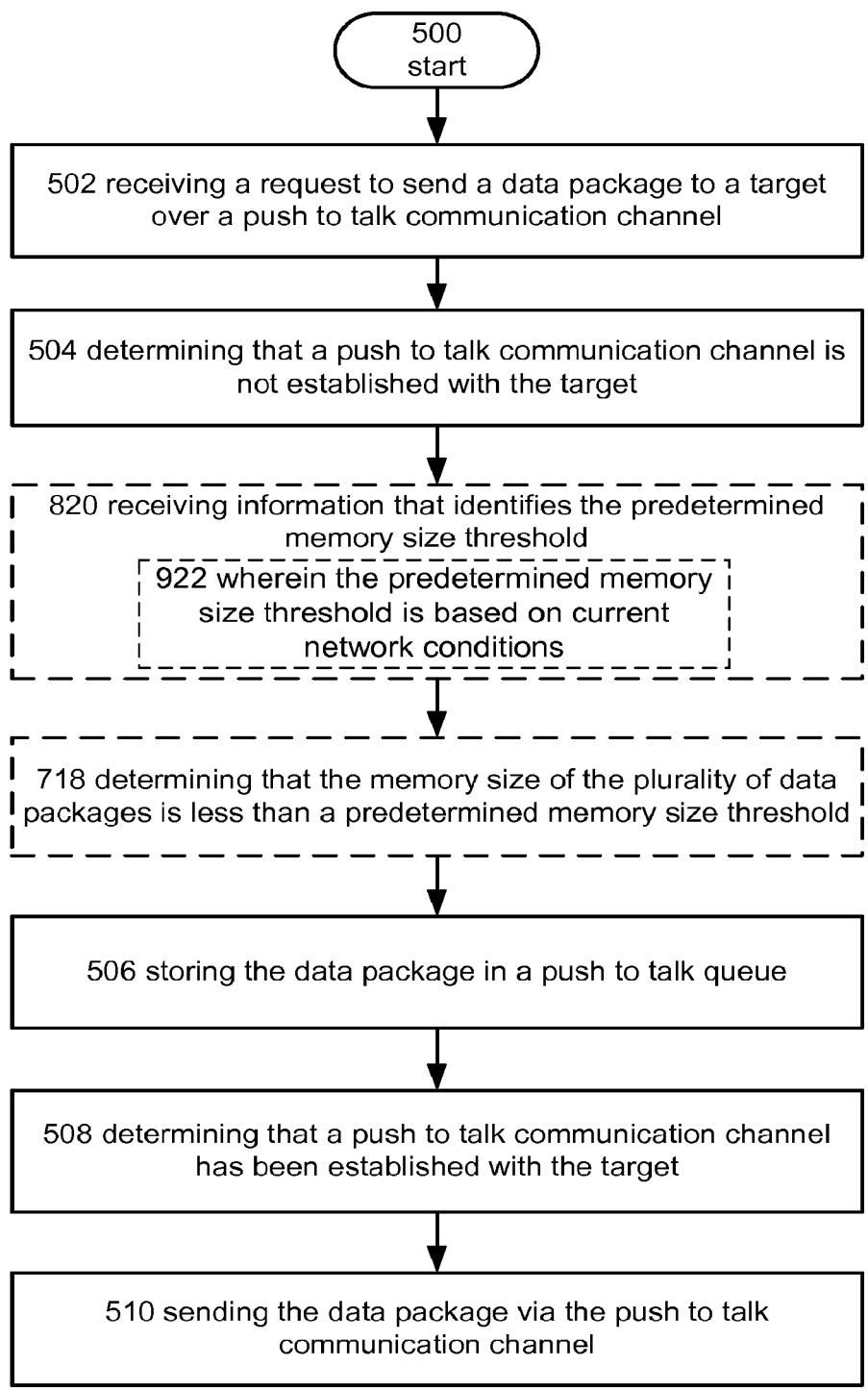
FIG. 9 illustrates an alternative embodiment of the operational procedure of FIG. 7.

Referring to FIG. 9, it depicts an alternative embodiment of the operational procedure of FIG. 8 including operation 922 which shows that in an embodiment the predetermined memory size threshold is based on current network conditions. For example, current network condition based information can be used to dynamically set the memory size threshold value. For example, the network conditions can include a value that reflects the number of data channels that are available for a given base station. In another example, the current network conditions can include a value that reflects the average number of data channels that are in-use across a geographic location, e.g., a base station, an area code, a zip code, a city, etc. In an embodiment the predetermined memory size threshold can be a value that is a function of the number of data channels that are in-use. When the number of in-use data channels increases, so can the threshold. In an embodiment a table can be available for each base station controller that indicates various thresholds in relationship to how many data channels are available. In one example, if 80% of the data channels are in-use then the threshold could be 5 megabytes and if 20% of the data channels are in-use the threshold can be 1 megabyte. Other methods for determining the optimal point to send the queued data can be used, such as the number of the data packets held in memory, criteria of importance of the data packets held in memory (such as a priority ranking scheme) or other triggers that would be apparent to one of skill in the art.

Figure 10:
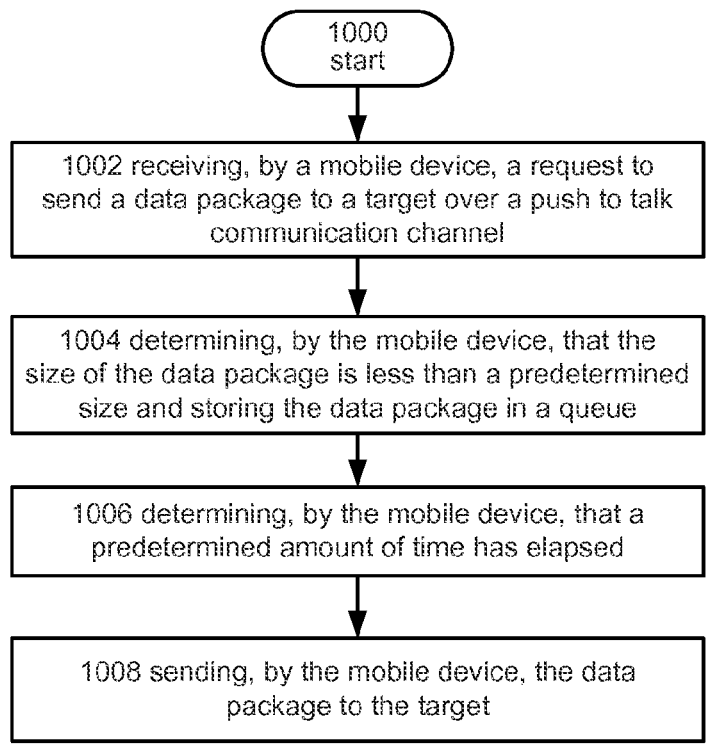
FIG. 10 illustrates an example operational procedure 1000.

Turning now to FIG. 10, it illustrates an operational procedure for practicing aspects of the present disclosure that includes operations 1000, 1002, 1004, 1006, and 1008. Operation 1000 begins the operational procedure and operation 1002 shows receiving, at a wireless communication device, a request to send a data package to a target over a group communication channel. For example, and referring to FIG. 2, the processor 208 can execute instructions indicative of the PTT-aware UI 224 and a user interface can be displayed by display 204. The user input interface of wireless communication device 200, e.g., a keyboard, touchpad, mouse, trackball, etc., can receive a request to send data packages over a push to talk communication channel. In a specific example, a user may wish to quickly send a video captured by his or her device a member of his or her group 302 and thus, decide to send the video via push to talk instead of by email.

Continuing with the description of FIG. 10, operation 1004 shows determining that the size of the data package is less than a predetermined size and storing the data package in a queue. For example, the processor 208 can execute instructions that configure it to determine how large the data package is and compare the size of the data package to a predetermined size value. In this example, the object can be less than the size limit and, instead of sending the data package to the target, it can be stored in a queue and sent at a later point. For example, storing the data package in the queue can include storing a pointer to the data package in an area of memory identified as the queue or it can include physically storing a copy of the data package in an area identified as the queue.

Operation 1006 shows determining, by the mobile device, that a predetermined amount of time has elapsed. In an example embodiment when the data package, e.g., a pointer to the object, is stored in a queue an internal timer can be set to expire after a predetermined amount of time, e.g., 10 seconds. The predetermined value can be set by a network administrator and can be based on various conditions. In an example embodiment when the timer expires an interrupt can be sent to processor 208 and it can execute interrupt handler instructions.

Operation 1008 illustrates upon a group communication channel being open, sending, from the wireless communication device, the data package to the target. After the predetermined amount time elapses the data package can be sent to the target, e.g., another wireless communication device and/or a media server 316. For example, in a specific embodiment the interrupt handler instructions can be executed by processor 208 and processor can execute the media client 228. The processor 208 can send the data package to the target via a transceiver of the device. In this example, delay can be introduced into the process of sending a data package until, for example, the predetermined amount of time elapses or a PTT channel is established with the target. That is, in an embodiment an interrupt can be set to expire at the end of a predetermined time period but if a PTT channel is established prior to the interrupt being sent, the media client 228 can be run and the interrupt can be cleared. In this case since a PTT channel was opened for another reason it could be used to upload the data package.

Figure 11:
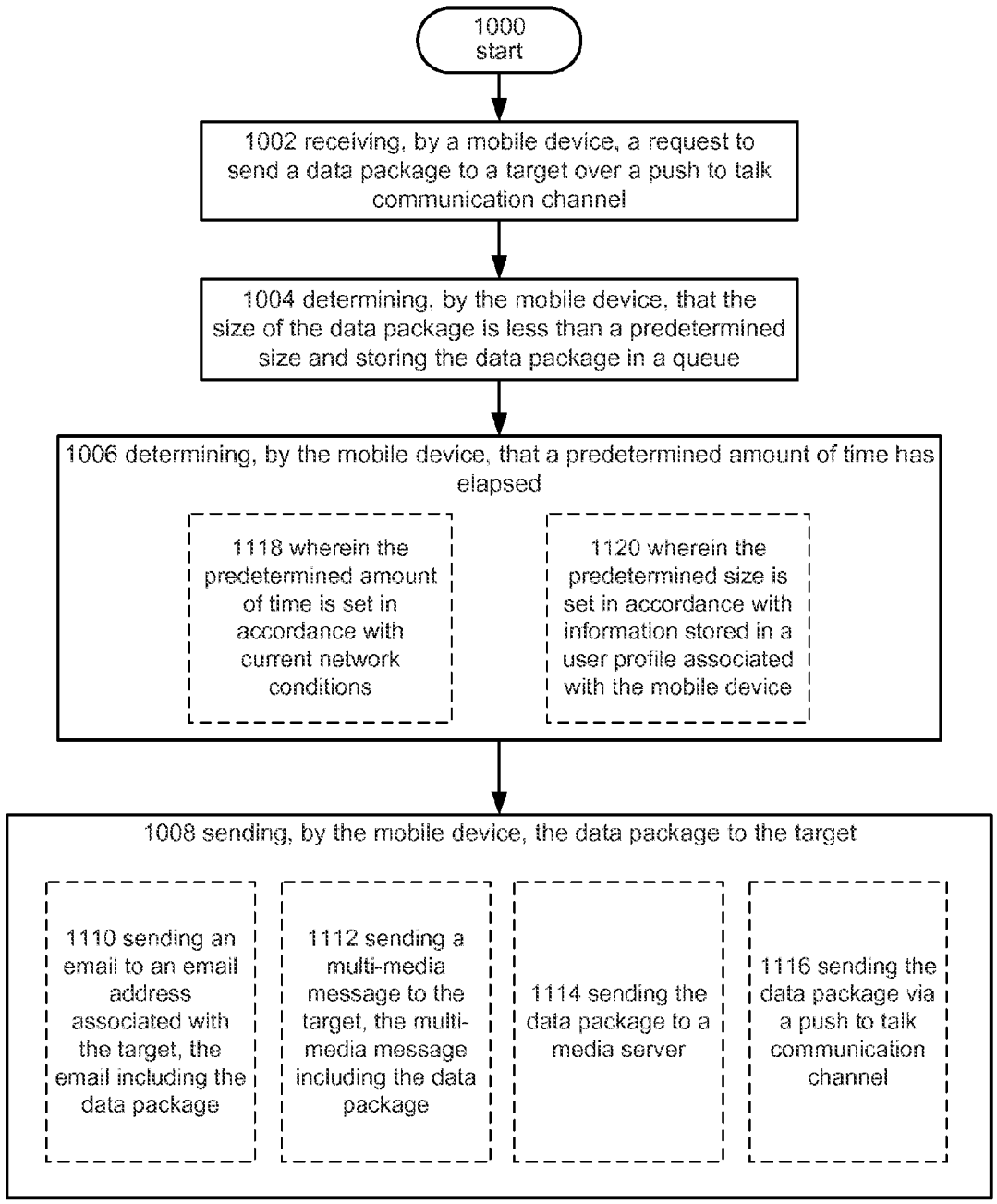
FIG. 11 illustrates an alternative embodiment of the operational procedure of FIG. 10.

Turning now to FIG. 11, it illustrates an alternative embodiment of the operational procedure 1000 of FIG. 10 including the additional operations 1110, 1112, 1114, 1116, 1118, and 1120. Operation 1110 shows sending an email to an email address associated with the target wireless communication device, the email including the data package. In this example embodiment the target can be associated with an email account. In this example when the timer expires the processor 208 can execute instructions obtain an email address from an electronic address book stored in memory of the wireless communication device 200. In this example, the processor 208 can execute instructions that configure it to obtain an email address for the target from the address book and pass information to an email client that can generate a message that includes the data package. The email can then be sent to the address associated with the target device 304.

Operation 1112 of FIG. 11 shows sending a multi-media message to the target wireless communication device, the multi-media message including the data package. In this exemplary embodiment when the timer expires the processor 208 can execute instructions a multi-media message client which can generate a multi-media message that includes the data package; and send the multi-media message to the target.

Operation 1114 of FIG. 11 shows to a media server. In this exemplary embodiment the target can be the media server 316. For example, the processor 208 can execute instructions indicative of the media client 228 and can send one or more packets of information indicative of the data package to a media server 316. The media server 316 can be configured to send the data package to the target, e.g., device 304 via a PTT channel or via some other delivery mechanism, e.g., email, multi-data package message, etc.

Operation 1116 of FIG. 11 shows the sending the data package via a group communication channel. For example, the originating device can send the data package to the target via the established PTT channel after the predetermined amount of time has elapsed. That is, a PTT channel can be established with the target after the predetermined amount of time elapses. In a specific example, an interrupt can be generated by a timer and the interrupt handler code can be executed by the processor 208 which configures it to run the media client 228. The media client 228 can be executed and the processor 208 can send the data packages to the target via a transceiver of the device. When a PTT channel is requested the communications server 310 can receive a call setup request message indicating that a user of device 200 wants to establish a push to talk session. The call setup request can contain, for instance, the target device's address, and an indication that data packages are to be shared, and information that identifies the media server 316 that stores media for the wireless communication device 200.

Operation 1118 of FIG. 11 shows the predetermined amount of time is set in accordance with current network conditions. For example, in an embodiment current network condition based information can be used to dynamically set a value indicative of the predetermined amount of time. For example, the predetermined amount of time can increase as pressure on the network's resources increases. In one example embodiment the pressure on the network can be calculated from information that reflects the number of data channels that are available for a given base station. In other example, a value that reflects the average number of data channels that are in-use across a geographic location can be used.

Operation 1120 of FIG. 11 shows that the predetermined size is set in accordance with information stored in a user profile associated with the wireless communication device. For example, in an embodiment user profile information can define a priority level for the user that operates device 200. This information can be stored in a database coupled to the AAA 428 and/or on the wireless communication device 200, e.g., in a SIM card for example. In an embodiment certain types of users can have different predetermined size thresholds. For example, premium accounts or accounts that are associated with emergency services providers can have lower thresholds than other users.

Figure 12:
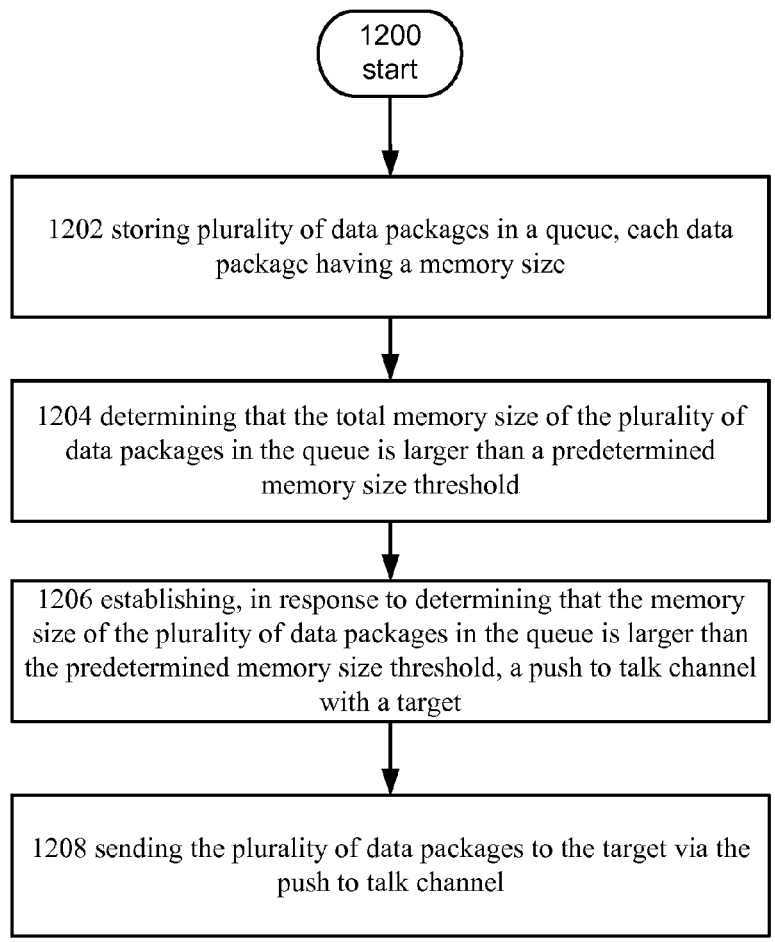
FIG. 12 illustrates an example operational procedure 1200.

Referring now to FIG. 12, it illustrates an operational procedure for practicing aspects of the present disclosure including operations 1200, 1202, 1204, 1206, and 1208. Operation 1200 begins the operational process and operation 1202 depicts storing a plurality of data packages in a queue, each data package having a memory size. For example, in an embodiment, memory 212 can store a plurality of data packages or pointers to the locations of data packages and for each data package information that identifies a target address can also be stored. In this example each data package can have a size, for example one data package may have a size of 1 megabyte and another data package may have a size of 3 megabytes. In an example embodiment a processor 208 can be used to store the data packages in memory 212. In this example the processor 208 could execute instructions that direct it to store a copy of a data package or a pointer to a location of the data package in a specific area of memory 212 reserved for the queue and the processor 208 can modify values in a data structure associated with the queue to indicate that the data package has been stored.

Continuing with the description of FIG. 12, operation 1204 shows determining that the total memory size of the plurality of data packages in the queue is larger than a predetermined memory size threshold. For example, processor 208 can determine that the total memory size of the plurality of data packages in the queue is larger than a predetermined memory size threshold. For example, in an embodiment the processor 208 can run instructions when a data package is added to the queue that direct it to, for example, add the size of each data package in the queue to obtain a total; and compare the total to a predetermined value. If the total is larger than the predetermined memory size threshold then information indicative of the result of the operation can be stored in memory and sent to, for example, the media client 228.

In an embodiment a data structure can be stored in memory 212 that includes a total for each target that has data packages in the queue. As a new data package is added the processor 208 can execute instructions to determine if the target's address is in the data structure. If it is, then its total can be updated otherwise the target can be added to the list. In an embodiment, the processor 208 can either be configured to determine that the total memory size of all the objects in the queue is greater than a predetermined value or it can be configured to determine that the total memory size of all data packages associated with a specific addressee is greater than a predetermined value. More generally, the determination can be based on the total memory size of the data packages in the queue or it can be based on the total memory size of the data packages in the queue per target. In this, or another embodiment, the processor 208 can be configured to keep a total for each target and a total for the entire queue. When a data package is added to the queue the processor 208 can run instructions that check the total value of all data packages in the queue and check the total value associated with each target.

Operation 1206 shows establishing, in response to determining that the memory size of the plurality of data packages in the queue is larger than the predetermined memory size threshold, a push to talk channel with a target. In an example after the determination is made, a transceiver of device 200 can establish a push to talk communication channel with a target using techniques similar to those described above. In a specific example, the media client 228 can receive a signal and the processor 208 can execute instructions that send a signal to the push to talk client 226. Push to talk client instructions can then be executed and a PTT channel can be opened between the device 200 and the target, e.g., another device and/or the media server 316. The data packages can then be sent from the device 200 via the PTT channel.

In a specific example the target can be the media server 316. The PTT client 226 can configure the transceiver of device 200 to send all or a portion of the data packages in the media queue to the media server 316 where the data packages can be stored in a database 314. For example, in an embodiment where the total memory size of all the data packages in the queue is greater than a predetermined value, the PTT client 226 can be configured to send all the data packages to the media server 316 where they can be made available to devices such as device 304 and/or 306. In the same, or other embodiments if a total value associated with a target is greater than the predetermined value the PTT client 226 can configure the transceiver of the device 200 to open a PTT channel with the target.

Turning now to operation 1208 where is shown the step of sending the plurality of data packages to the target via the push to talk channel. For example, the originating device can send the data packages to the target via the established PTT channel. In a specific example, the media client 228 can be executed by the processor 208 and it can obtain the data packages from the queue and send them to the target via a transceiver of the device. In this example, since the data packages are grouped together the cost on the network of setting up multiple sessions just to send data packages is reduced.

Figure 13:
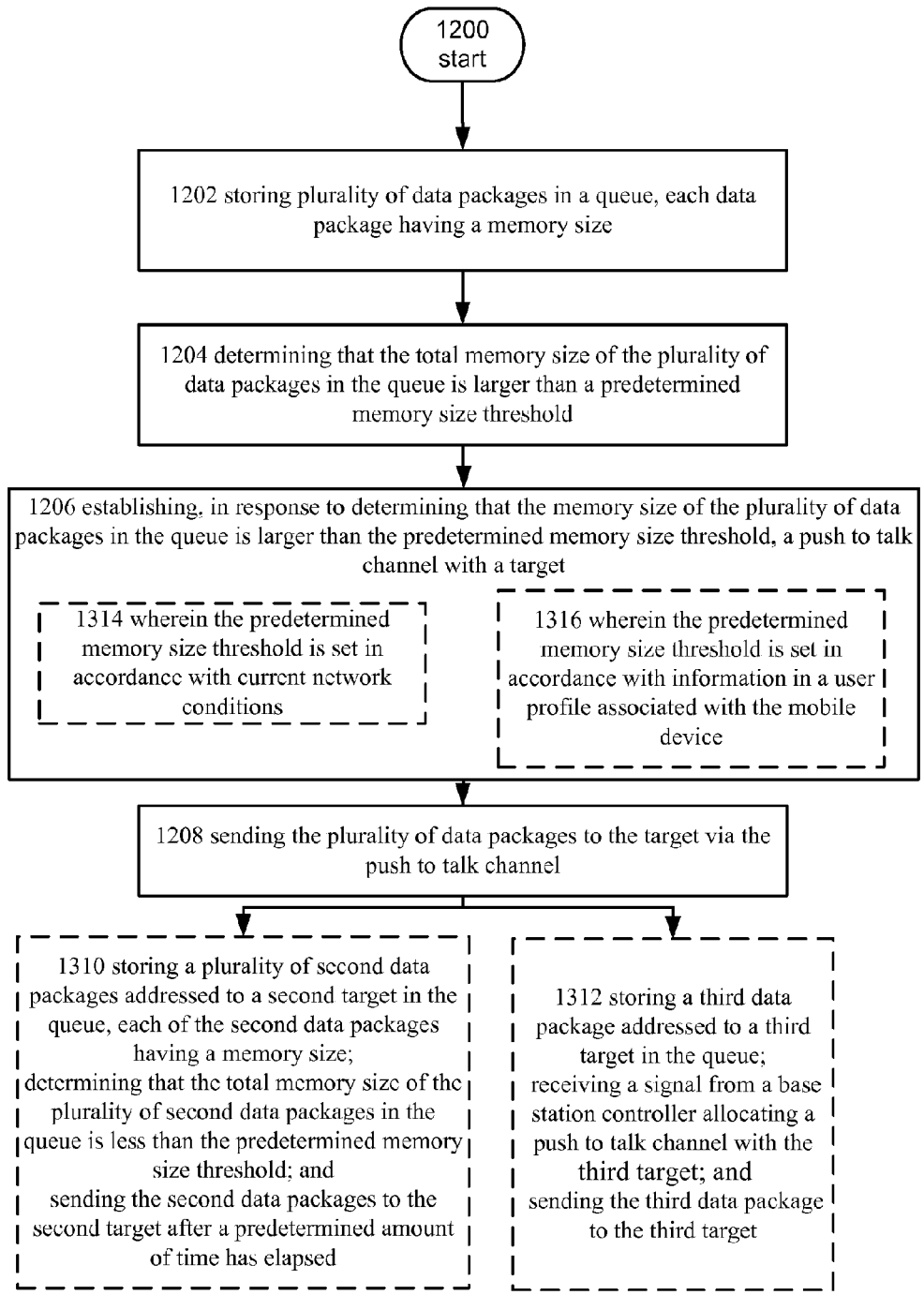
FIG. 13 illustrates an alternative embodiment of the operational procedure of FIG. 12.

FIG. 13 illustrates an alternative embodiment of the operational procedure 1200 of FIG. 12 including additional operations 1310-1316. Operation 1310 shows storing a plurality of second data packages addressed to a second target in the queue, each of the second data packages having a memory size; determining that the total memory size of the plurality of second data packages in the queue is less than the predetermined memory size threshold; and sending the second data packages to the second target after a predetermined amount of time has elapsed. In an embodiment that includes operation 1310, the processor 208 can execute instructions that configure it to determine how large the data packages addressed to a second target in the queue are, and compare this value to the predetermined memory size threshold. In an embodiment, if the size of the memory objects is less than the predetermined value then the device 200 can be configured to store the data packages in the queue for a predetermined amount of time prior to sending them. For example, when the data packages are stored in the queue an internal timer can be set to expire after a predetermined amount of time, e.g., 10 seconds. In an example embodiment when the timer expires an interrupt can be sent to processor 208 and the processor 208 can execute specific interrupt handler instructions. The processor 208 can obtain the data packages from the queue and send them to the target via a transceiver of the device. In this example, delay can be introduced into the process of sending a data package until, for example, the predetermined amount of time elapses or a PTT channel is established with the target.

Continuing with the description of FIG. 13, operation 1312 shows storing a third data package addressed to a third target in the queue; receiving a signal from a base station controller allocating a push to talk channel with the third target; and sending the third data package to the third target. In an embodiment that includes operation 1312, a data package can be stored in the queue that is addressed to a third target. In a specific example the data package may be less than a predetermined size. After a period of time device 200 may receive a signal from a base station controller 418 indicating that a PTT channel has been established with the third target. For example, an operator of the third device may have opened a PTT channel with the device 200 or the operator of the device may have decided to open a PTT channel with the third device. In this example the device 200 can then send the third data package to the third target via the channel. In a specific example the media client 228 can be configured to listen for when channels are opened and if one is opened with the third target an interrupt can be sent to the processor 208. Processor 208 can then execute instructions that send the data package to the third device.

Operation 1314 of FIG. 13 depicts that in an embodiment wherein the predetermined memory size threshold is set in accordance with current network conditions. For example, current network condition based information can be used to dynamically set the memory size threshold value. For example, the network conditions can include a value that reflects the number of data channels that are available for a given base station. In another example, the current network conditions can include a value that reflects the average number of data channels that are in-use across a geographic location, e.g., a base station, an area code, a zip code, a city, etc. In an embodiment the predetermined memory size threshold can be a value that is a function of the number of data channels that are in-use. When the number of in-use data channels increases, so can the threshold.

Operation 1316 of FIG. 13 depicts that in an embodiment wherein the predetermined memory size threshold is set in accordance with information in a user profile associated with the mobile device. For example, in an embodiment user profile information can define a priority level for the user. This information can be stored in a database coupled to the AAA 428 and/or on the wireless communication device 200, e.g., in a SIM card for example.

Figure 14:
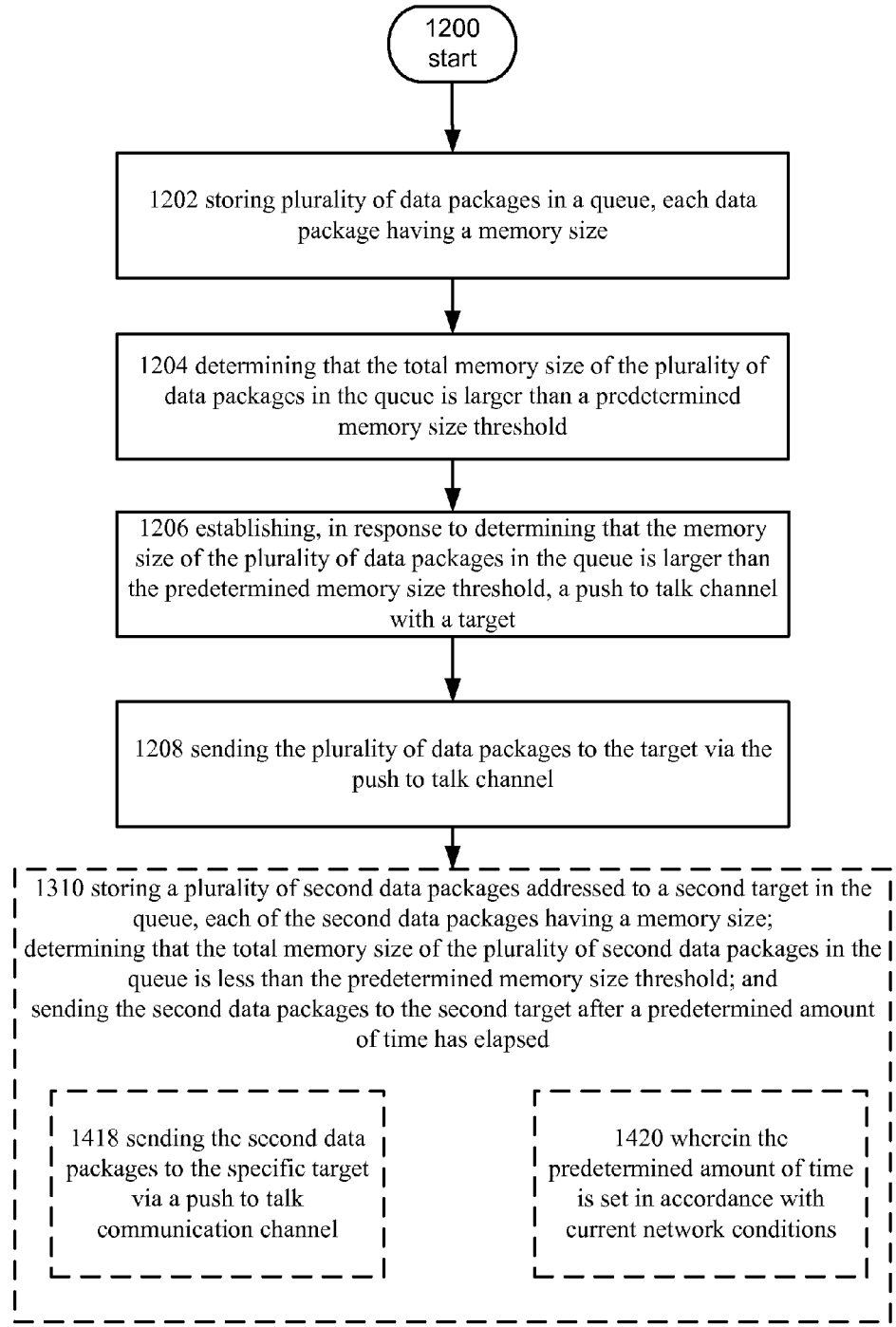
FIG. 14 illustrates an alternative embodiment of the operational procedure of FIG. 13.

Turning now to FIG. 14, it illustrates an alternative embodiment of the operational procedure of FIG. 13 including operations 1418 and 1420. Operation 1418 shows sending the second data packages to the specific target via a push to talk communication channel. For example, the originating device can send the data packages to the second target via a PTT channel after the predetermined amount of time has elapsed. In a specific example, an interrupt can be generated by a timer and the interrupt handler code can be executed by the processor 208 which configures it to run the media client 228. The media client 228 can be executed and the processor 208 can send the data packages to the second target via a transceiver of the device. When a PTT channel is requested the communications server 310 can receive a call setup request message indicating that a user of device 200 wants to establish a push to talk session. The call setup request can contain, for instance, the target device's address, and an indication that data packages are to be shared, and information that identifies the media server 316 that stores media for the wireless communication device 200.

Operation 1420 shows wherein the predetermined amount of time is set in accordance with current network conditions, such as the likely availability of communication channels, costs of setting up group communications, or general traffic at the device. For example, in an embodiment current network condition based information can be used to dynamically set a value indicative of the predetermined amount of time. For example, the predetermined amount of time can increase as pressure on the network's resources increases. In one example embodiment the pressure on the network can be calculated from information that reflects the number of data channels that are available for a given base station. In other example, a value that reflects the average number of data channels that are in-use across a geographic location can be used.

Figure 15:
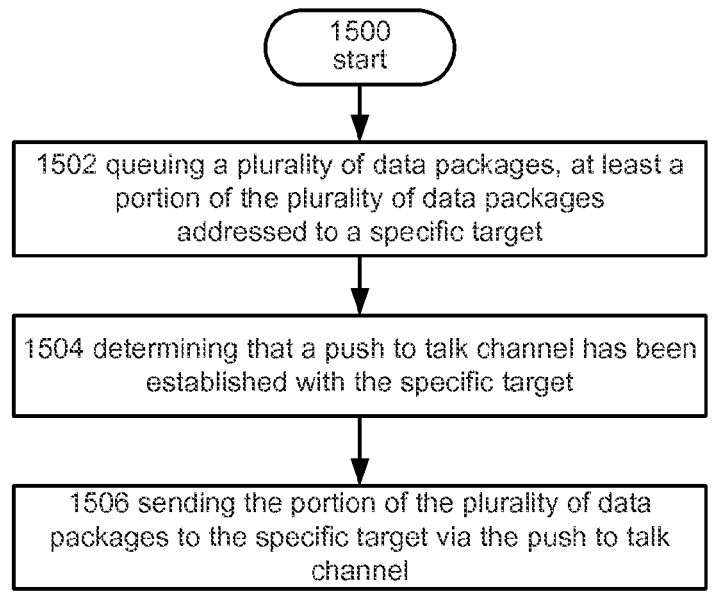
FIG. 15 illustrates an example operational procedure 1500.

Turning now to FIG. 15, it illustrates an operational procedure for practicing aspects of the present disclosure including operations 1500-1506. Operation 1500 starts the procedure, and operation 1502 shows queuing a plurality of data packages, at least a portion of the plurality of data packages addresses to a specific target. For example, a plurality of data packages or pointers to the locations of data packages can be queued and for each data package information that identifies a target address can be stored. In this embodiment at least some of the data packages can be addressed to a specific target such as device 304. In an example embodiment a processor 208 can be used to queue the data packages.

Continuing with the description of FIG. 15, operation 1504 depicts determining that a push to talk channel has been established with the specific target. For example, sometime after the data packages have been queued, a PTT channel may be established between the originator, e.g., device 200, and the specific target device, e.g., device 304. In this example, the media client 228 could have configured processor 208 to listen for connections made between the originator and the target. In this example when a channel is opened with the target the media client 228 can receive information indicating that a channel has been opened. Similar to that described above, a floor grant message received from a communications server 310 can be used to indicate that a PTT session has been established with the specific target. When such a signal is received the processor 208 can be interrupted and directed to execute the media client 228.

Continuing with the description of FIG. 15, operation 1506 depicts sending the portion of the plurality of data packages to the specific target via the push to talk channel. For example, the originating device can send the data packages to the target via the established PTT channel over a transceiver. In a specific example, when the processor 208 detects that a channel has been established between the originator and the specific device an interrupt can be generated that directs the processor 208 to execute media client 228. The processor 208 can send the data packages to the target via a transceiver of the device. In this example, since the data packages are sent during a PTT channel that is already established, the cost of setting up sessions on the network is reduced.

Figure 16:
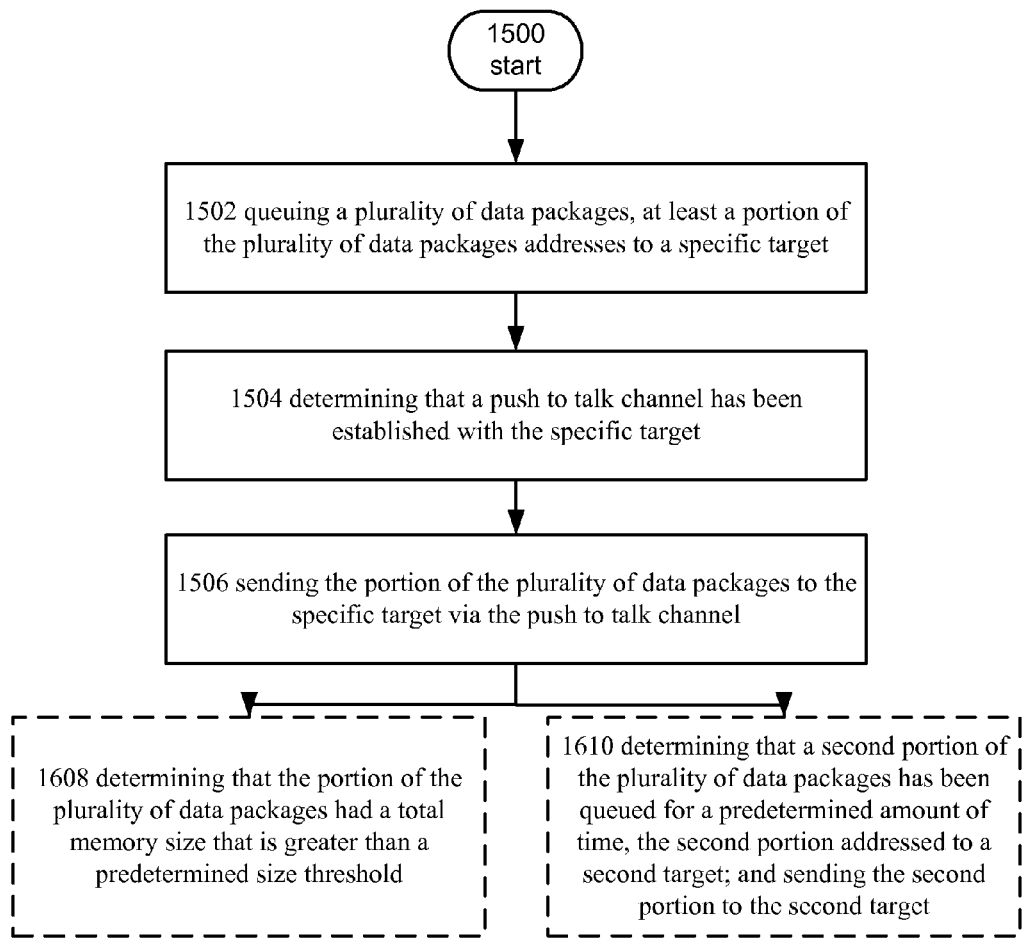
FIG. 16 illustrates an alternative embodiment of the operational procedure of FIG. 15.

Turning now to FIG. 16, it illustrates an alternative embodiment of the operational procedure 1500 including operations 1608 and 1610. Operation 1608 depicts determining that the portion of the plurality of data packages had a total memory size that is greater than a predetermined size threshold. For example, processor 208 can determine that the total memory size of the portion of data packages addressed to the specific target is larger than a predetermined memory size threshold. For example, in an embodiment the processor 208 can run instructions when a data package is queued that direct it to, for example, add the size of the data package to a total value of queued data packages to obtain a total; and compare the total to a predetermined value. If the total is larger than the predetermined memory size threshold then information indicative of the result of the operation can be stored in memory and sent to, for example, the media client 228.

Continuing with the description of FIG. 16, operation 1610 shows determining that a second portion of the plurality of data packages has been queued for a predetermined amount of time, the second portion addressed to a second target; and sending the second portion to the second target. In an embodiment that includes operation 1610, data packages that are addressed to a second target can be queued. When the data packages addressed to the second target are queued a timer can be set to expire after a predetermined amount of time, e.g., 5 minutes. If the timer expires an interrupt can be sent to processor 208 and it can execute specific interrupt handler instructions that discover that data packages addressed to the second target have been in the queue for the predetermined amount of time. The processor 208 can then send the queued data packages to the second target via a transceiver of the device. In this example, delay can be introduced into the process of sending a data package until, for example, the predetermined amount of time elapses or a PTT channel is established with the target.

Figure 17:
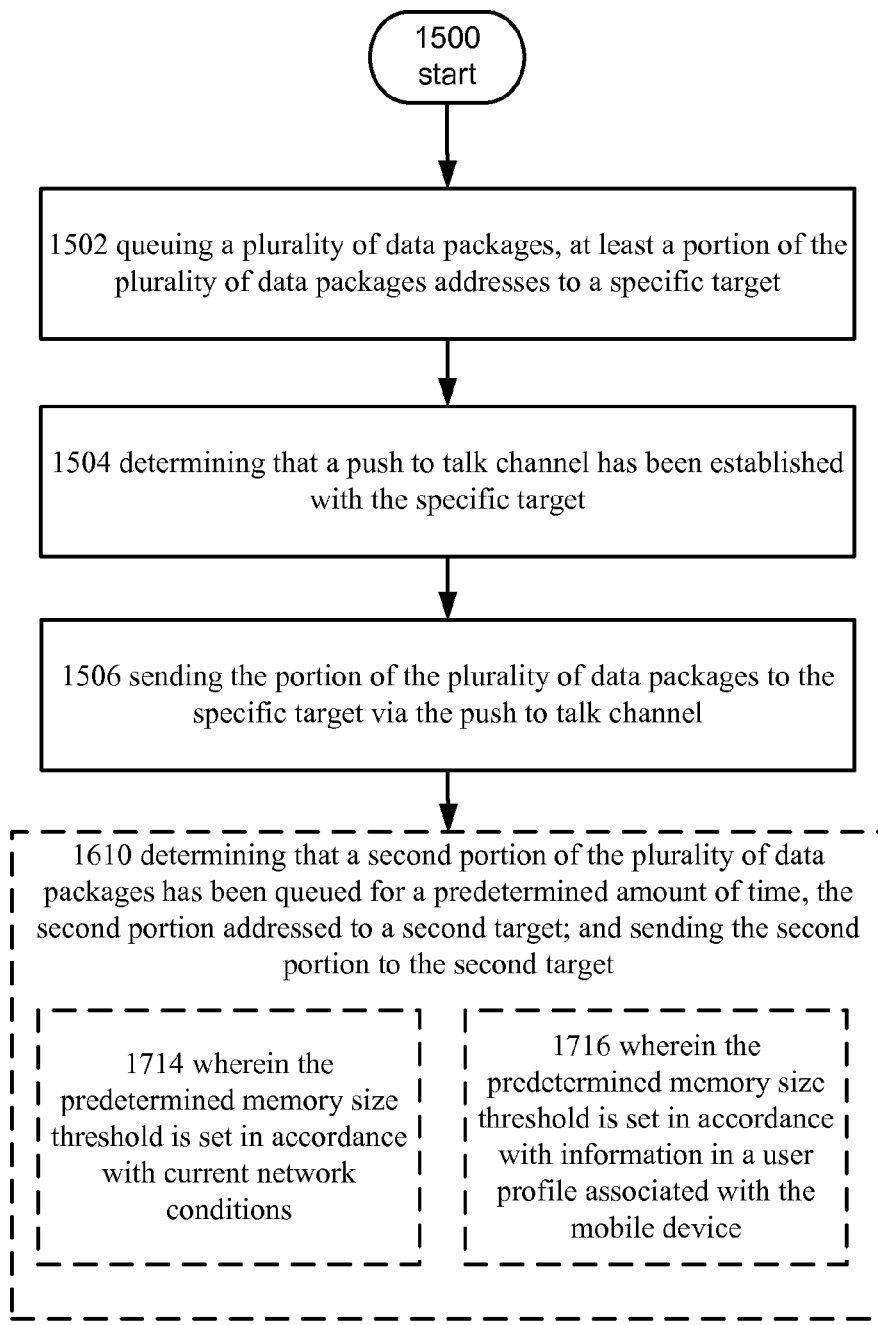
FIG. 17 illustrates an alternative embodiment of the operational procedure of FIG. 16.

FIG. 17 illustrates an alternative embodiment of the operational procedure of FIG. 16 including the additional operations 1714 and 1716. Operation 1714 illustrates that wherein the predetermined memory size threshold is set in accordance with current network conditions. For example, in an embodiment current network conditions based information can be used to dynamically set the memory size threshold value.

Operation 1716 of FIG. 17 shows that the predetermined memory size threshold is set in accordance with information in a user profile associated with the mobile device. For example, in an embodiment user profile information can define a priority level for the user that operates device 200. This information can be stored in a database coupled to the AAA 428 and/or on the wireless communication device 200, e.g., in a SIM card for example.

Figure 18:
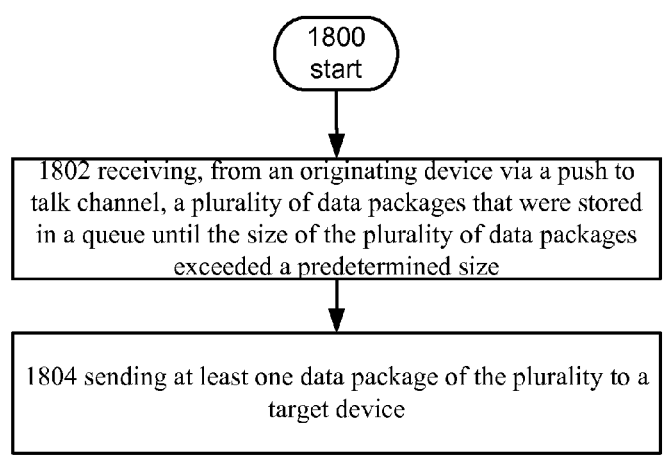
FIG. 18 illustrates an example operational procedure 1800.

FIG. 18 illustrates an operational procedure for practicing aspects of the present disclosure including operations 1800 through 1804. Operation 1800 begins the procedure and operation 1802 illustrates receiving, from an originating device via a push to talk channel, a plurality of data packages that were stored in a queue until the size of the plurality of data packages exceeded a predetermined size. In an embodiment, the communication server 310 can receive a plurality of data packages via a push to talk channel. The plurality of data packages or pointers to the data packages could have previously been stored in a queue, e.g., memory 212, of a device 200, until the size of the data packages in the queue was greater than a predetermined value.

Operation 1804 shows sending at least one data package of the plurality to a target device. For example, at least one of the data packages can be sent to a target device. For example, when the PTT channel was setup by a communications server 310 a media server 316 could have been notified and added to the communications channel. The media server 316 in this example could be used to store data packages and send them to the target.

Figure 19:
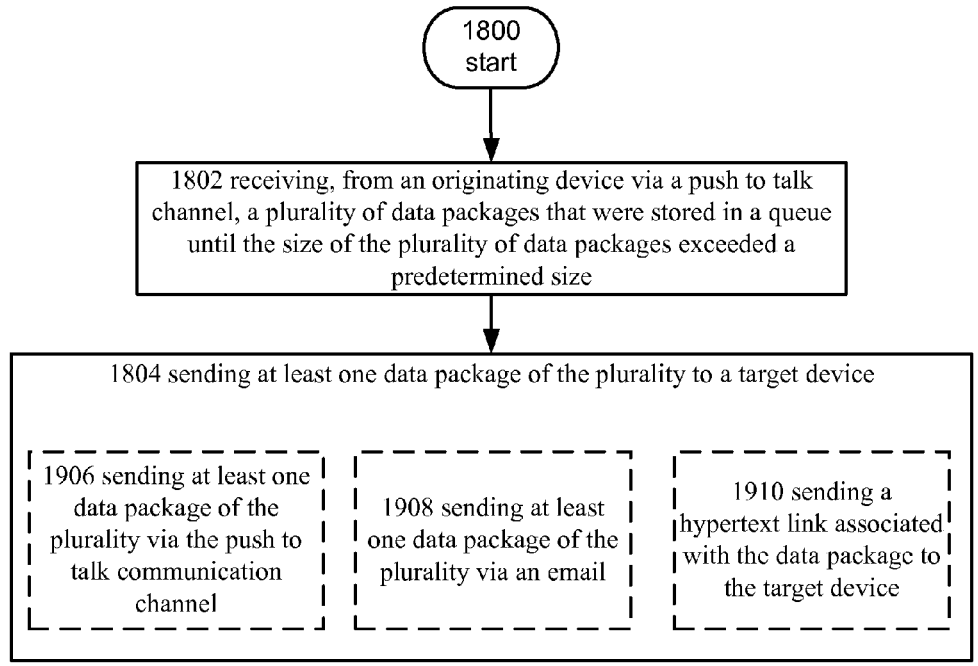
FIG. 19 illustrates an alternative embodiment of the operational procedure of FIG. 18.

Turning now to FIG. 19, it illustrates an alternative embodiment of the operational procedure of FIG. 18 including operations 1906, 1908, and 1910. Operation 1906 shows sending at least one data package of the plurality via the push to talk communication channel. For example, in an embodiment a processor 102 of the communications server 310 can setup the PTT channel between the originator and the target using techniques describe above and can send one or more packets of information indicative of at least one data package.

Continuing with the description of FIG. 19, operation 1908 shows at least one data package in the queue via an email. In this exemplary embodiment communications server 310 or the media server 316 can send an email that includes the data package to the target. For example, the wireless network 308 can include a computer system or process that can generate emails. In this example a user profile can include a table which maps telephone addresses to email accounts. In this example, a processor can execute instructions that configure it to obtain an email address for the target and pass information to an email client that can generate a message that includes the data package. The email can then be sent to the address associated with the target device.

Continuing with the description of FIG. 19, operation 1910 shows sending a hypertext link associated with the data package to the target device. In an embodiment the media server 316 can store the data packages in the database and generate hypertext links for the data packages. In this example, the hypertext links can then be sent to the targets and when an operator of the target clicks on the hypertext link the media server 316 can receive the request; obtain the data package associated with the hypertext link; and send the data package to the target.

Figure 20:
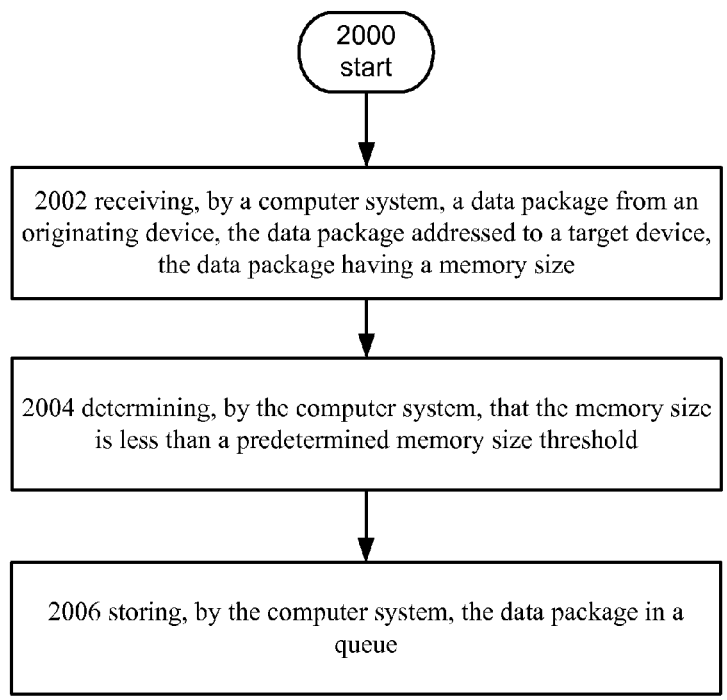
FIG. 20 illustrates an example operational procedure 2000.

Turning now to FIG. 20, it depicts an operational procedure for practicing aspects of the present disclosure including operations 2000 through 2008. Operation 2000 begins the procedure and operation 2002 illustrates receiving, by a computer system, a data package from an originating device, the data package addressed to a target device, the data package having a memory size. In an embodiment a media server 316, e.g., a computer system that can include components similar to computer system 100 of FIG. 1, can receive a data package from an originating device, e.g., device 200. In this example the data package can be addressed to a target, e.g., it can include the telephone number of device 306, and the data package can have a quality that identifies its size.

Continuing with the description of FIG. 20, operation 2004 shows determining, by the computer system, that the memory size is less than a predetermined memory size threshold. In an embodiment of the present disclosure, the computer system, e.g., circuitry, can determine how large the data package is and compare this value to a predetermined value. In an embodiment, if the size of the memory object is less than the predetermined value then the media server 316 can be configured to wait until a PTT channel is opened with the target before sending the data package. In a specific example, the predetermined threshold could be set to 5 megabytes. In this case, if the data package is 1 megabyte in size, then the total would be less than the predetermined threshold.

Continuing with the description of FIG. 20, operation 2006 shows storing, by the computer system, the data package in a queue. In this example the media server 316 can determine that the size of the data package is less than the predetermined threshold the data package, or a pointer to the data package can be stored in a queue, e.g. memory of the media server 316.

In this example, instead of establishing a PTT channel, the data package can be stored and sent at a later point.

Figure 21:
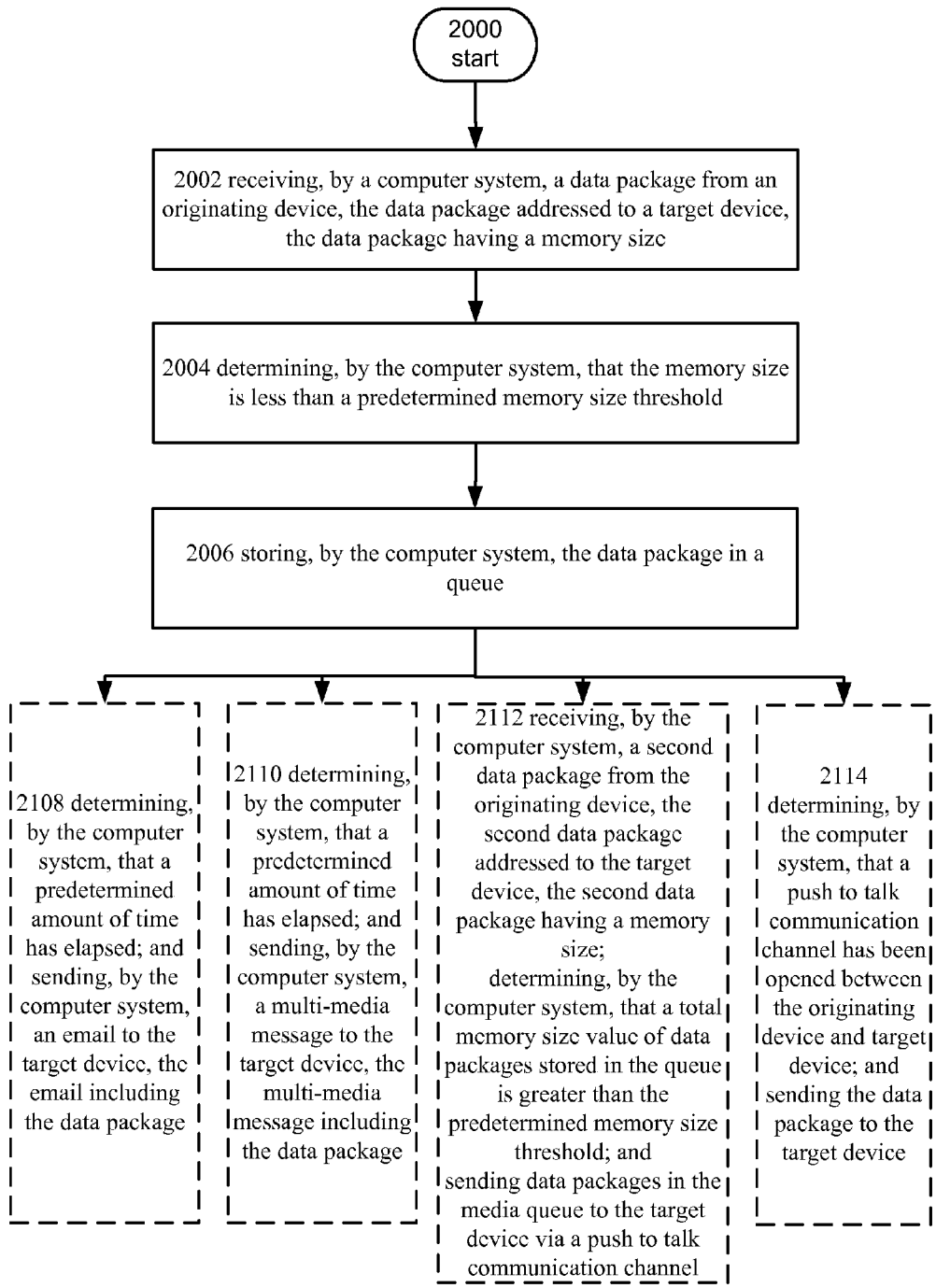
FIG. 21 illustrates an alternative embodiment of the operational procedure of FIG. 20.

Turning now to FIG. 21, it illustrates an alternative embodiment of the operational procedure 2000 of FIG. 20 including operations 2108-2114. Operation 2108 shows determining, by the computer system, that a predetermined amount of time has elapsed; and sending, by the computer system, an email to the target device, the email including the data package. In an exemplary embodiment, when the data package is queued a timer can be set to expire after a predetermined amount of time. If the timer expires an interrupt can be sent to processor of media server 102 and the processor 102 can execute specific interrupt handler instructions. For example, in a specific embodiment the interrupt handler instructions can be executed by processor 102 and it can send the data package to the target via an email.

Continuing with the description of FIG. 21, operation 2110 shows determining, by the computer system, that a predetermined amount of time has elapsed; and sending, by the computer system, a multi-media message to the target device, the multi-media message including the data package. In an example embodiment when the data package is stored queued a timer can be set to expire after a predetermined amount of time. If the timer expires, an interrupt can be sent to processor of media server 102 and the processor 102 can execute specific interrupt handler instructions. In this exemplary embodiment, the processor 102 can execute instructions that generate a multi-media message that includes the data package. For example, the wireless communication device 200 can pass the address of the target and the data package to multi-media message client which can generate a multi-media message that includes the data package. The multi-media message can then be sent to the address associated with the target.

Continuing with the description of FIG. 21, operation 2112 shows receiving, by the computer system, a second data package from the originating device, the second data package addressed to the target device, the second data package having a memory size; determining, by the computer system, that a total memory size value of data packages stored in the queue is greater than the predetermined memory size threshold; and sending data packages in the media queue to the target device via a push to talk communication channel. For example, processor 102 can determine that the total memory size of the plurality of data packages in the queue is larger than a predetermined memory size threshold. For example, in an embodiment a processor 102 of a computer system can run instructions when a data package is added to the queue that direct it to, for example, add the size of each data package in the queue to obtain a total; and compare the total to a predetermined value. If the total is larger than the predetermined memory size threshold then information indicative of the result of the operation can be stored in memory. After the determination is made the data packages can be sent to the target via an established PTT channel.

Continuing with the description of FIG. 21, operation 2114 shows determining, by the computer system, that a push to talk communication channel has been opened between the originating device and target device; and sending the data package to the target device. For example, sometime after the data package has been stored in the queue, a PTT channel may be established between the originator, e.g., device 200, and a target device. In this example, the communications server 310 can receive a call setup request message identifying the target and the originator. In this example the communications server 310 can send a signal to the media server 316 which can determine that a connection has been made between the originator and the target. The media server 316 can signal the communications server 310 indicating that a data package is queued that is addressed to the target and the communications server 310 can setup a channel that includes media handling capabilities and send the data package to the target device.

Figure 22:
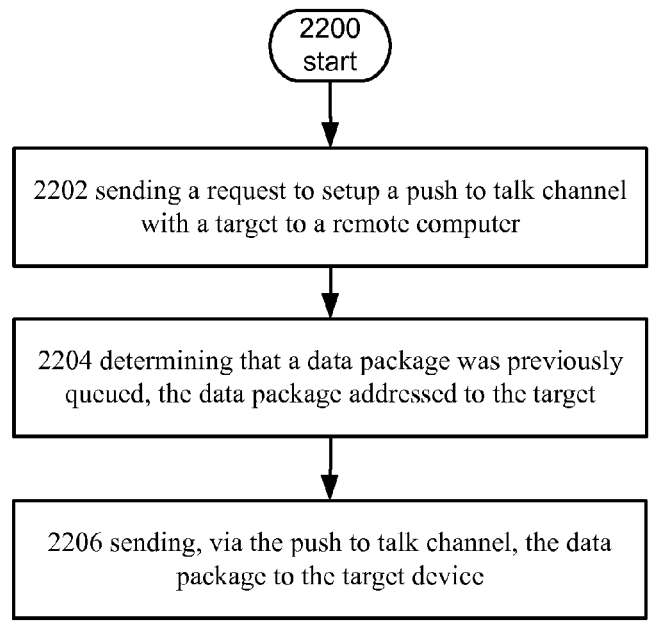
FIG. 22 illustrates an example operational procedure 2200.

Turning now to FIG. 22, it illustrates an alternative embodiment of the operational procedure 2200 of FIG. 22 including operations 2200-2206. Operation 2202 shows sending a request to setup a push to talk channel with a target to a remote computer. In an example embodiment an originating device, e.g., device 200, can establish a PTT channel with a target device, e.g., device 304. For example, a user of device 200 can press a PTT button 202 that directs the wireless communication device 200 to send a PTT call setup request to communications server 310. In this example the communications server 310 can setup a PTT channel between the originator and the target, e.g., the communications server 310 can allocate separate point-to-point connections between each IP endpoint in the network.

Continuing with the description of FIG. 22, operation 2204 shows determining that a data package was previously queued, the data package addressed to the target. For example, after a PTT channel has been setup between the originator and the target, a processor 208 can determine that a data package was previously queued, the data package being addressed to the target. In a specific example processor 208 can be interrupted and the media client 228 can be executed. The processor 208 can determine that a data package addressed to the target has been queued by checking information in, for example, a data structure stored in memory 212.

Turning now to operation 2206, it illustrates sending, via the push to talk channel, the data package to the target device. For example, a transceiver of device 200 can send one or more packets of information indicative of the data package over the push to talk channel to the target device. In a specific example, the processor 208 can run media client 228 and information can be sent to the transceiver. The transceiver can then send the data package to the target via the network 308.

Figure 23:
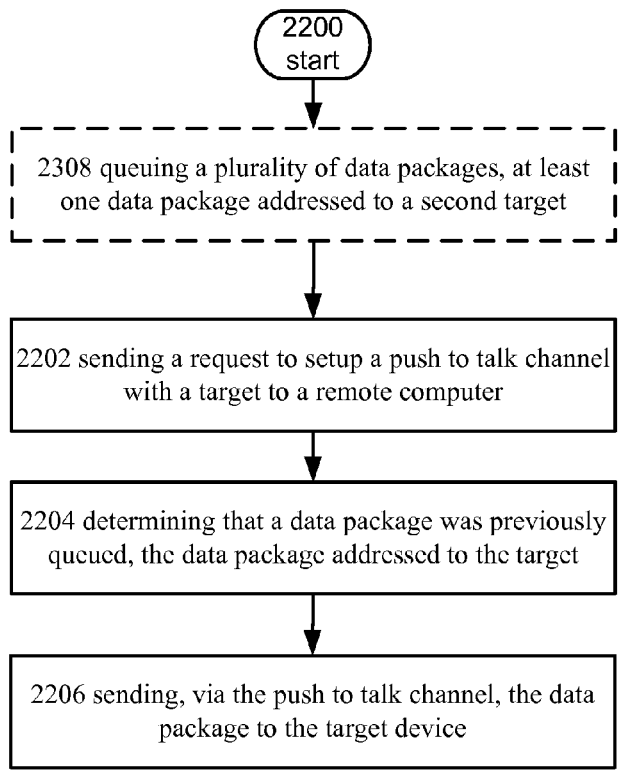
FIG. 23 illustrates an alternative embodiment of the operational procedure of FIG. 22.

FIG. 23 illustrates an alternative embodiment of the operational procedure 2200 of FIG. 22 including additional operation 2308 which illustrates queuing a plurality of data packages, at least one data package addressed to a second target. For example, in an embodiment, a plurality of data packages, at least one being addressed to a second target, can be queued. For example, information identifying that the data packages have been queued can be stored in a data structure that is stored in memory 212 and used by media client 228.

Figure 24:
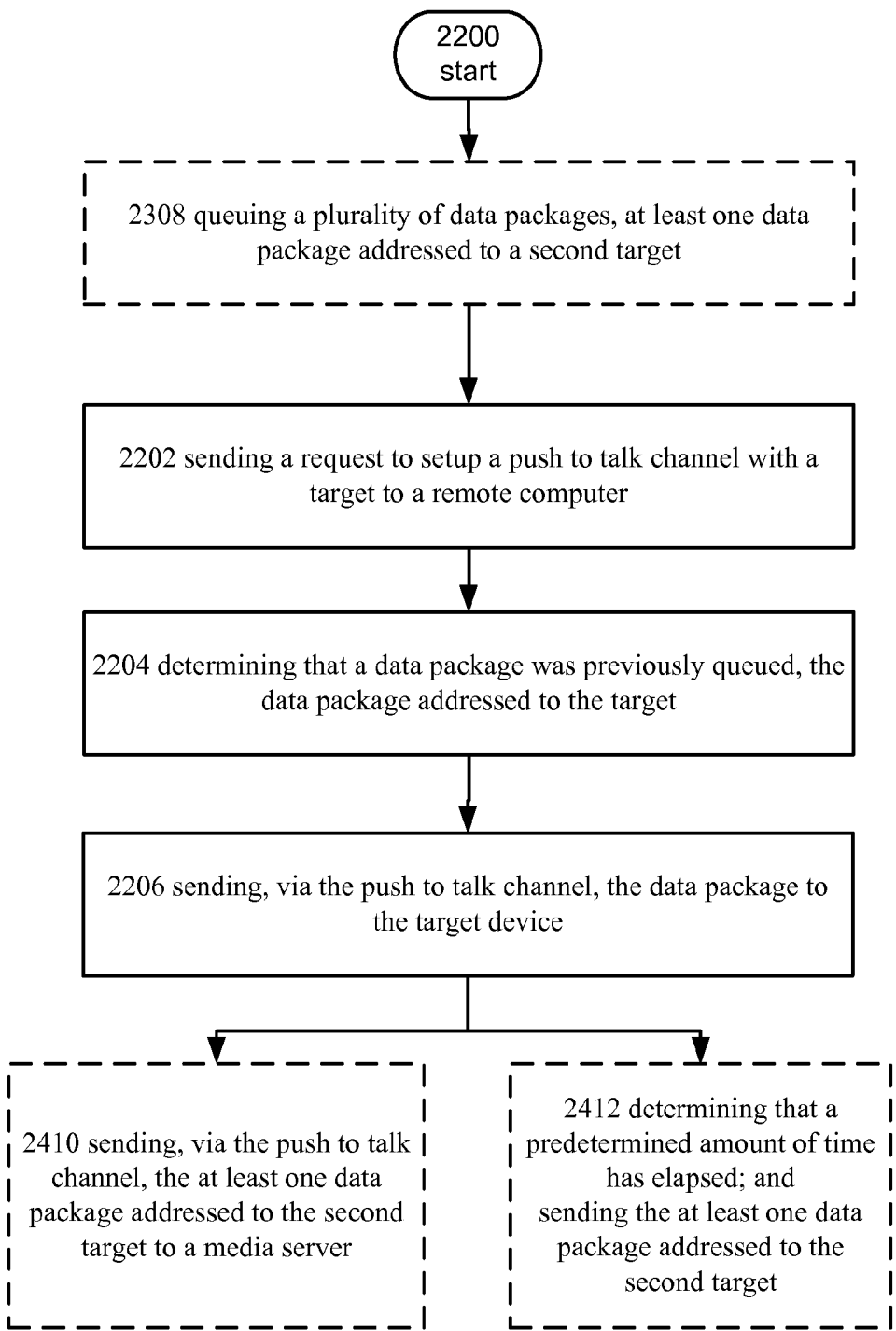
FIG. 24 illustrates an alternative embodiment of the operational procedure of FIG. 23.

FIG. 24 illustrates an alternative embodiment of the operational procedure 2200 of FIG. 22 including additional operations 2410 and 2412. Operation 2410 illustrates sending, via the push to talk channel, the at least one data package addressed to the second target to a media server. For example, in an embodiment the communications server 310 can establish a PTT channel by combining separate point-to-point connections between each IP endpoint in the network, one of which can be the media server 316. In this example, when the PTT channel is opened the processor 208 can be interrupted and media client 228 can be executed. The processor 208 can determine that a data package addressed to the target has been queued by checking information in, for example, a data structure stored in memory 212 and since a channel is opened, it can be used to send additional data packages. The data package addressed to the second target however can be sent to the media server 316 since a channel has not been established with the second target. The media server 316 can then store the data package addressed to the second target and it can be sent to the second target at a later point.

Operation 2412 illustrates determining that a predetermined amount of time has elapsed; and sending the at least one data package addressed to the second target. For example, in an example embodiment when the data package is queued, a timer can be set to expire after a predetermined amount of time. The predetermined value can be set by a network administrator and can be based on various conditions. In an example embodiment when the timer expires an interrupt can be sent to processor 208 and interrupt handler instructions can be executed by processor 208. The interrupt handler instructions can direct processor 208 to execute the media client 228 and the processor 208 can send the data package to the target via a transceiver of the device. In this example, delay can be introduced into the process of sending a data package until, for example, the predetermined amount of time elapses or a PTT channel is established with the any target.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method, comprising:
   receiving, at a wireless communication device, a request to send a data package to a target over a group communication channel;
   determining whether the group communication channel is open at the wireless communication device; and
   in response to determining that the group communication channel is not open at the wireless communication device performing:
   selectively storing the data package in a queue configured to store a plurality of data packages;
   determining whether a memory size of the plurality of data packages stored in the queue is greater than a predetermined memory size threshold;
   in response to determining that the memory size of the plurality of data packages stored in the queue is not greater than the predetermined memory size threshold, determining whether an indication that the group communication channel has been opened is received at the wireless communication device; and
   in response to receiving an indication that the group communication channel has been opened, sending, from the wireless communication device, all data packages stored in the queue intended for the target.

2. The method of claim 1, wherein:
   receiving the indication that the group communication channel has been opened comprises receiving an indication that a push-to-talk (PTT) call is established with the target.

3. The method of claim 2, wherein sending, from the wireless communication device, all data packages stored in the queue intended for the target comprises sending all data packages stored in the queue in conjunction with a talk spurt using a same floor control mechanism that is used to send voice data in the PTT call.

4. The method of claim 2, wherein sending, from the wireless communication device, all data packages stored in the queue intended for the target comprises sending all data packages stored in the queue using a floor control mechanism that is different from another floor control mechanism used to send voice data in the PTT call.

5. A method, comprising:
   receiving, at a server, a data package from an originating wireless communication device over a group communication channel, wherein the data package is intended to be sent to one or more of target group members of a communication group;
   determining whether the group communication channel is open from the server to all of the target group members;
   selectively storing the data package in a queue in response to determining that the group communication channel is not open from the server to all of the target group members, wherein the queue is configured to store a plurality of data packages;
   determining whether a memory size of the plurality of data packages stored in the queue is greater than a predetermined memory size threshold;
   in response to determining that the memory size of the plurality of data packages stored in the queue is not greater than the predetermined memory size threshold, determining whether the group communication channel with all of the target group members has been opened; and
   sending all data packages stored in the queue intended for the target group members in response to determining that the group communication channel with all of the target group members has been opened.

6. A method, comprising:
   receiving, at a wireless communication device, a request to send a data package to a target over a group communication channel;
   determining whether the group communication channel is open at the wireless communication device;
   selectively storing the data package in a queue configured to store a plurality of data packages in response to determining that the group communication channel is not open at the wireless communication device;
   identifying all data packages stored in the queue that are intended for the target;
   determining whether a memory size of all data packages stored in the queue that are intended for the target is greater than a predetermined memory size threshold;
   establishing the group communication channel in response to determining that the memory size of all data packages stored in the queue intended for the target is greater than the predetermined memory size threshold; and
   sending to the target, from the wireless communication device, all data packages stored in the queue intended for the target over the established group communication channel.

7. The method of claim 6, further comprising:
   in response to determining that the memory size of the plurality of data packages stored in the queue is not greater than the predetermined memory size threshold, determining whether the group communication channel has been opened; and
   sending to the target, from the wireless communication device, all data packages stored in the queue intended for the target in response to determining that the group communication channel has been opened.

8. The method of claim 7, wherein:
determining whether the group communication channel has been opened comprises receiving an indication that a push-to-talk (PTT) call is established with the target.

9. The method of claim 8, wherein sending to the target from the wireless communication device all data packages stored in the queue intended for the target over the established group communication channel comprises sending all data packages stored in the queue intended for the target in conjunction with a talk spurt using a same floor control mechanism that is used to send voice data in the PTT call.

10. The method of claim 8, wherein sending to the target from the wireless communication device all data packages stored in the queue intended for the target over the established group communication channel comprises sending all data packages stored in the queue intended for the target using a floor control mechanism that is different from another floor control mechanism used to send voice data in the PTT call.

11. A method, comprising:
receiving, at a server, a data package from an originating wireless communication device over a group communication channel, wherein the data package is intended to be sent to one or more of target group members of a communication group;
determining whether the group communication channel is open from the server to all of the target group members;
selectively storing the data package in a queue configured to store a plurality of data packages in response to determining that the group communication channel is not open from the server to all of the target group members;
identifying all data packages stored in the queue intended for the target group members;
determining whether a memory size of all data packages stored in the queue intended for the target group members is greater than a predetermined memory size threshold;
establishing the group communication channel from the server to the target group members in response to determining that the memory size of all data packages stored in the queue intended for the target group members is greater than the predetermined memory size threshold; and
sending all data packages stored in the queue intended for the target group members over the established group communication channel.

12. The method of claim 11, further comprising:
in response to determining that the memory size of the plurality of data packages stored in the queue is not greater than the predetermined memory size threshold, determining whether the group communication channel with all of the target group members has been opened; and
sending all data packages stored in the queue intended for the target group members in response to determining that the group communication channel with all of the target group members has been opened.

13. A wireless communication device, comprising:
a direct communication interface;
an internal memory; and
a processor coupled to the direct communication interface and the internal memory, wherein the processor is configured with processor-executable instructions to perform operations comprising:
receiving a request to send a data package to a target over a group communication channel;
determining whether the group communication channel is open; and
in response to determining that the group communication channel is not open performing operations comprising:
selectively storing the data package in a queue configured to store a plurality of data packages;
determining whether a memory size of the plurality of data packages stored in the queue is greater than a predetermined memory size threshold;
in response to determining that the memory size of the plurality of data packages stored in the queue is not greater than the predetermined memory size threshold, determining whether an indication that the group communication channel has been opened is received; and
in response to receiving an indication that the group communication channel has been opened, sending all data packages stored in the queue intended for the target.

14. The wireless communication device of claim 13, wherein the processor is configured with processor-executable instructions to perform operations such that receiving an indication that the group communication channel has been opened comprises receiving an indication that a push-to-talk (PTT) call is established with the target.

15. The wireless communication device of claim 14, wherein the processor is configured with processor-executable instructions to perform operations such that sending all data packages stored in the queue intended for the target comprises sending all data packages stored in the queue in conjunction with a talk spurt using a same floor control mechanism that is used to send voice data in the PTT call.

16. The wireless communication device of claim 14, wherein the processor is configured with processor-executable instructions to perform operations such that sending all data packages stored in the queue intended for the target comprises sending all data packages stored in the queue using a floor control mechanism that is different from another floor control mechanism used to send voice data in the PTT call.

17. A server, comprising:
a network interface;
an internal memory; and
a processor coupled to the network interface and the internal memory, wherein the processor is configured with processor-executable instructions to perform operations comprising:
receiving a data package from an originating wireless communication device over a group communication channel, wherein the data package is intended to be sent to one or more of target group members of a communication group;
determining whether the group communication channel is open with all of the target group members;
selectively storing the data package in a queue in response to determining that the group communication channel is not open with all of the target group members, wherein the queue is configured to store a plurality of data packages;
determining whether a memory size of the plurality of data packages stored in the queue is greater than a predetermined memory size threshold;
in response to determining that the memory size of the plurality of data packages stored in the queue is not greater than the predetermined memory size threshold, determining whether the group communication channel with all of the target group members has been opened; and sending all data packages stored in the queue intended for the target group members in response to determining that the group communication channel with all of the target group members has been opened.

18. A system for selectively sending data packages using group communications, comprising:
a server;
a wireless communications network; and
a wireless communication device interconnected to the server through the wireless communications network,
wherein the server is configured with executable instructions to perform operations comprising:
receiving a data package from the wireless communication device over a group communication channel, wherein the data package is intended to be sent to one or more target group members of a communication group;
determining whether the group communication channel is open with all of the target group members;
selectively storing the data package in a queue in response to determining that the group communication channel is not open with all of the target group members, wherein the queue is configured to store a plurality of data packages;
determining whether a memory size of the plurality of data packages stored in the queue is greater than a predetermined memory size threshold;
in response to determining that the memory size of the plurality of data packages stored in the queue is not greater than the predetermined memory size threshold, determining whether the group communication channel with all of the target group members has been opened; and
sending all data packages stored in the queue intended for the target group members in response to determining that the group communication channel with all of the target group members has been opened.

19. A wireless communication device, comprising:
a direct communication interface;
an internal memory; and
a processor coupled to the direct communication interface and the internal memory, wherein the processor is configured with processor-executable instructions to perform operations comprising:
receiving a request to send a data package to a target over a group communication channel;
determining whether the group communication channel is open;
selectively storing the data package in a queue configured to store a plurality of data packages in response to determining that the group communication channel is not open;
identifying all data packages stored in the queue that are intended for the target;
determining whether a memory size of all data packages stored in the queue that are intended for the target is greater than a predetermined memory size threshold;
establishing the group communication channel in response to determining that the memory size of all data packages stored in the queue intended for the target is greater than the predetermined memory size threshold; and
sending to the target from the wireless communication device all data packages stored in the queue intended for the target over the established group communication channel.

20. The wireless communication device of claim 19, wherein the processor is configured with processor-executable instructions to perform operations further comprising:
in response to determining that the memory size of the plurality of data packages stored in the queue is not greater than the predetermined memory size threshold, determining whether the group communication channel has been opened; and
sending to the target all data packages stored in the queue intended for the target in response to determining that the group communication channel has been opened.

21. The wireless communication device of claim 20, wherein the processor is configured with processor-executable instructions to perform operations such that determining whether the group communication channel has been opened comprises receiving an indication that a push-to-talk (PTT) call is established with the target.

22. The wireless communication device of claim 21, wherein the processor is configured with processor-executable instructions to perform operations such that sending to the target all data packages stored in the queue intended for the target over the established group communication channel comprises sending all data packages stored in the queue intended for the target in conjunction with a talk spurt using a same floor control mechanism that is used to send voice data in the PTT call.

23. The wireless communication device of claim 21, wherein the processor is configured with processor-executable instructions to perform operations such that sending to the target all data packages stored in the queue intended for the target over the established group communication channel comprises sending all data packages stored in the queue intended for the target using a floor control mechanism that is different from another floor control mechanism used to send voice data in the PTT call.

24. A server, comprising:
a network interface;
an internal memory; and
a processor coupled to the network interface and the internal memory, wherein the processor is configured with processor-executable instructions to perform operations comprising:
receiving a data package from an originating wireless communication device over a group communication channel, wherein the data package is intended to be sent to one or more of target group members of a communication group;
determining whether the group communication channel is open with all of the target group members;
selectively storing the data package in a queue configured to store a plurality of data packages in response to determining that the group communication channel is not open with all of the target group members;
identifying all data packages stored in the queue intended for the target group members;
determining whether a memory size of all data packages stored in the queue intended for the target group members is greater than a predetermined memory size threshold;
establishing the group communication channel with the target group members in response to determining that the memory size of all data packages stored in the queue intended for the target group members is greater than the predetermined memory size threshold; and sending all data packages stored in the queue intended for the target group members over the established group communication channel.

25. The server of claim 24, wherein the processor is configured with processor-executable instructions to perform operations further comprising:

in response to determining that the memory size of the plurality of data packages stored in the queue is not greater than the predetermined memory size threshold, determining whether the group communication channel with all of the target group members has been opened; and sending all data packages stored in the queue intended for the target group members in response to determining that the group communication channel with all of the target group members has been opened.

26. A system for selectively sending data packages using group communications, comprising:

a server a wireless communications network; and a wireless communication device interconnected to the server through the wireless communications network, wherein the server is configured with executable instructions to perform operations comprising:

receiving a data package from the wireless communication device over a group communication channel, wherein the data package is intended to be sent to one or more of target group members of a communication group;

determining whether the group communication channel is open with all of the target group members;

selectively storing the data package in a queue configured to store a plurality of data packages in response to determining that the group communication channel is not open with all of the target group members;

identifying all data packages stored in the queue intended for the target group members;

determining whether a memory size of all data packages stored in the queue intended for the target group members is greater than a predetermined memory size threshold;

establishing the group communication channel with the target group members in response to determining that the memory size of all data packages stored in the queue intended for the target group members is greater than the predetermined memory size threshold; and sending all data packages stored in the queue intended for the target group members over the established group communication channel.

27. A wireless communication device, comprising:

means for receiving a request to send a data package to a target over a group communication channel;

means for determining whether the group communication channel is open; and means for selectively storing the data package in a queue configured to store a plurality of data packages in response to determining that the group communication channel is not open;

means for determining whether a memory size of the plurality of data packages stored in the queue is greater than a predetermined memory size threshold;

means for determining whether an indication that the group communication channel has been opened is received in response to determining that the memory size of the plurality of data packages stored in the queue is not greater than the predetermined memory size threshold; and means for sending all data packages stored in the queue intended for the target in response to receiving an indication that the group communication channel has been opened.

28. The wireless communication device of claim 27, wherein means for determining whether an indication that the group communication channel has been opened is received comprises means for determining whether an indication that a push-to-talk (PTT) call is established with the target is received.

29. The wireless communication device of claim 28, wherein means for sending all data packages stored in the queue intended for the target comprises means for sending all data packages stored in the queue in conjunction with a talk spurt using a same floor control mechanism that is used to send voice data in the PTT call.

30. The wireless communication device of claim 28, wherein sending all data packages stored in the queue intended for the target comprises sending all data packages stored in the queue using a floor control mechanism that is different from another floor control mechanism used to send voice data in the PTT call.

31. A server, comprising:

means for receiving a data package from an originating wireless communication device over a group communication channel, wherein the data package is intended to be sent to one or more of target group members of a communication group;

means for determining whether the group communication channel is open with all of the target group members;

means for selectively storing the data package in a queue in response to determining that the group communication channel is not open with all of the target group members, wherein the queue is configured to store a plurality of data packages;

means for determining whether a memory size of the plurality of data packages stored in the queue is greater than a predetermined memory size threshold;

means for determining whether the group communication channel with all of the target group members has been opened in response to determining that the memory size of the plurality of data packages stored in the queue is not greater than the predetermined memory size threshold; and means for sending all data packages stored in the queue intended for the target group members in response to determining that the group communication channel with all of the target group members has been opened.

32. A wireless communication device, comprising:

means for receiving a request to send a data package to a target over a group communication channel;

means for determining whether the group communication channel is open;

means for selectively storing the data package in a queue configured to store a plurality of data packages in response to determining that the group communication channel is not open;

means for identifying all data packages stored in the queue that are intended for the target;

means for determining whether a memory size of all data packages stored in the queue that are intended for the target is greater than a predetermined memory size threshold;

means for establishing the group communication channel in response to determining that the memory size of all data packages stored in the queue intended for the target is greater than the predetermined memory size threshold; and means for sending to the target from the wireless communication device all data packages stored in the queue intended for the target over the established group communication channel.

33. The wireless communication device of claim 32, further comprising:
   means for determining whether the group communication channel has been opened in response to determining that the memory size of the plurality of data packages stored in the queue is not greater than the predetermined memory size threshold; and
   means for sending to the target all data packages stored in the queue intended for the target in response to determining that the group communication channel has been opened.

34. The wireless communication device of claim 33, wherein:
   means for determining whether the group communication channel has been opened comprises means for receiving an indication that a push-to-talk (PTT) call is established with the target.

35. The wireless communication device of claim 34, wherein means for sending to the target all data packages stored in the queue intended for the target over the established group communication channel comprises means for sending all data packages stored in the queue intended for the target in conjunction with a talk spurt using a same floor control mechanism that is used to send voice data in the PTT call.

36. The wireless communication device of claim 34, wherein means for sending to the target all data packages stored in the queue intended for the target over the established group communication channel comprises means for sending all data packages stored in the queue intended for the target using a floor control mechanism that is different from another floor control mechanism used to send voice data in the PTT call.

37. A server, comprising:
   means for receiving a data package from an originating wireless communication device over a group communication channel, wherein the data package is intended to be sent to one or more of target group members of a communication group;
   means for determining whether the group communication channel is open with all of the target group members;
   means for selectively storing the data package in a queue configured to store a plurality of data packages in response to determining that the group communication channel is not open with all of the target group members;
   means for identifying all data packages stored in the queue intended for the target group members;
   means for determining whether a memory size of all data packages stored in the queue intended for the target group members is greater than a predetermined memory size threshold;
   means for establishing the group communication channel with the target group members in response to determining that the memory size of all data packages stored in the queue intended for the target group members is greater than the predetermined memory size threshold; and
   means for sending all data packages stored in the queue intended for the target group members over the established group communication channel.

38. The server of claim 37, further comprising:
   means for determining whether the group communication channel with all of the target group members has been opened in response to determining that the memory size of the plurality of data packages stored in the queue is not greater than the predetermined memory size threshold; and
   means for sending all data packages stored in the queue intended for the target group members in response to determining that the group communication channel with all of the target group members has been opened.

39. A non-transitory processor-readable storage medium having stored thereon processor-executable instructions configured to cause a processor of a wireless communication device to perform operations comprising:
   receiving a request to send a data package to a target over a group communication channel;
   determining whether the group communication channel is open; and
   in response to determining that the group communication channel is not open performing operations comprising:
      selectively storing the data package in a queue configured to store a plurality of data packages;
      determining whether a memory size of the plurality of data packages stored in the queue is greater than a predetermined memory size threshold;
      in response to determining that the memory size of the plurality of data packages stored in the queue is not greater than the predetermined memory size threshold, determining whether an indication that the group communication channel has been opened is received; and
      in response to receiving an indication that the group communication channel has been opened, sending all data packages stored in the queue intended for the target.

40. The non-transitory computer-readable storage medium of claim 39, wherein the stored processor-executable instructions are configured to cause a processor of a wireless communication device to perform operations such that receiving an indication that the group communication channel has been opened comprises receiving an indication that a push-to-talk (PTT) call is established with the target.

41. The non-transitory computer-readable storage medium of claim 40, wherein the stored processor-executable instructions are configured to cause a processor of a wireless communication device to perform operations such that sending all data packages stored in the queue intended for the target comprises sending all data packages stored in the queue in conjunction with a talk spurt using a same floor control mechanism that is used to send voice data in the PTT call.

42. The non-transitory computer-readable storage medium of claim 40, wherein the stored processor-executable instructions are configured to cause a processor of a wireless communication device to perform operations such that sending all data packages stored in the queue intended for the target comprises sending all data packages stored in the queue using a floor control mechanism that is different from another floor control mechanism used to send voice data in the PTT call.

43. A non-transitory processor-readable storage medium having stored thereon processor-executable instructions configured to cause a processor of a server to perform operations comprising:

receiving a data package from an originating wireless communication device over a group communication channel, wherein the data package is intended to be sent to one or more of target group members of a communication group;

determining whether the group communication channel is open with all of the target group members;

selectively storing the data package in a queue in response to determining that the group communication channel is not open with all of the target group members, wherein the queue is configured to store a plurality of data packages;

determining whether a memory size of the plurality of data packages stored in the queue is greater than a predetermined memory size threshold;

in response to determining that the memory size of the plurality of data packages stored in the queue is not greater than the predetermined memory size threshold, determining whether the group communication channel with all of the target group members has been opened; and sending all data packages stored in the queue intended for the target group members in response to determining that the group communication channel with all of the target group members has been opened.

44. A non-transitory computer-readable storage medium, having stored thereon processor-executable instructions configured to cause a processor of a wireless communication device to perform operations comprising:

receiving a request to send a data package to a target over a group communication channel;

determining whether the group communication channel is open;

selectively storing the data package in a queue configured to store a plurality of data packages in response to determining that the group communication channel is not open;

identifying all data packages stored in the queue that are intended for the target;

determining whether a memory size of all data packages stored in the queue that are intended for the target is greater than a predetermined memory size threshold;

establishing the group communication channel in response to determining that the memory size of all data packages stored in the queue intended for the target is greater than the predetermined memory size threshold; and sending to the target from the wireless communication device all data packages stored in the queue intended for the target over the established group communication channel.

45. The non-transitory computer-readable storage medium of claim 44, wherein the stored processor-executable instructions are configured to cause a processor of a wireless communication device to perform operations further comprising:

in response to determining that the memory size of the plurality of data packages stored in the queue is not greater than the predetermined memory size threshold, determining whether the group communication channel has been opened; and sending to the target all data packages stored in the queue intended for the target in response to determining that the group communication channel has been opened.

46. The non-transitory processor-readable storage medium of claim 45, wherein the stored processor-executable instructions are configured to cause a processor of a wireless communication device to perform operations such that:

determining whether the group communication channel has been opened comprises receiving an indication that a push-to-talk (PTT) call is established with the target.

47. The non-transitory processor-readable storage medium of claim 46, wherein the stored processor-executable instructions are configured to cause a processor of a wireless communication device to perform operations such that:

sending to the target all data packages stored in the queue intended for the target over the established group communication channel comprises sending all data packages stored in the queue intended for the target in conjunction with a talk spurt using a same floor control mechanism that is used to send voice data in the PTT call.

48. The non-transitory processor-readable storage medium of claim 46, wherein the stored processor-executable instructions are configured to cause a processor of a wireless communication device to perform operations such that:

sending to the target all data packages stored in the queue intended for the target over the established group communication channel comprises sending all data packages stored in the queue intended for the target using a floor control mechanism that is different from another floor control mechanism used to send voice data in the PTT call.

49. A non-transitory computer-readable storage medium, having stored thereon processor-executable instructions configured to cause a processor of a server to perform operations comprising:

receiving a data package from an originating wireless communication device over a group communication channel, wherein the data package is intended to be sent to one or more of target group members of a communication group;

determining whether the group communication channel is open with all of the target group members;

selectively storing the data package in a queue configured to store a plurality of data packages in response to determining that the group communication channel is not open with all of the target group members;

identifying all data packages stored in the queue intended for the target group members;

determining whether a memory size of all data packages stored in the queue intended for the target group members is greater than a predetermined memory size threshold;

establishing the group communication channel with the target group members in response to determining that the memory size of all data packages stored in the queue intended for the target group members is greater than the predetermined memory size threshold; and sending all data packages stored in the queue intended for the target group members over the established group communication channel.

50. The non-transitory processor-readable storage medium of claim 49, wherein the stored processor-executable instructions are configured to cause a processor of a server to perform operations further comprising:

in response to determining that the memory size of the plurality of data packages stored in the queue is not greater than the predetermined memory size threshold, determining whether the group communication channel with all of the target group members has been opened; and sending all data packages stored in the queue intended for the target group members in response to determining that the group communication channel with all of the target group members has been opened.

* * * * *